US012540259B2

(12) United States Patent
Duclos et al.

(10) Patent No.: US 12,540,259 B2
(45) Date of Patent: Feb. 3, 2026

(54) POTTING PASTE FOR HONEYCOMB REINFORCEMENT

(71) Applicant: Zephyros, Inc., Romeo, MI (US)

(72) Inventors: Vincent Duclos, Altorf (FR); Eric Elkaim, Altorf (FR); Estelle Huther Ebersohl, Altorf (FR); Michel Awkal, Altorf (FR)

(73) Assignee: ZEPHYROS, INC., Romeo, MI (US)

( * ) Notice: Subject to any disclaimer, the term of this patent is extended or adjusted under 35 U.S.C. 154(b) by 736 days.

(21) Appl. No.: 17/770,168

(22) PCT Filed: Nov. 10, 2020

(86) PCT No.: PCT/EP2020/081595
§ 371 (c)(1),
(2) Date: Apr. 19, 2022

(87) PCT Pub. No.: WO2021/094292
PCT Pub. Date: May 20, 2021

(65) Prior Publication Data
US 2022/0396719 A1 Dec. 15, 2022

(30) Foreign Application Priority Data

Nov. 13, 2019 (EP) .................................... 19208849

(51) Int. Cl.
*C09J 11/06* (2006.01)
*C08K 3/016* (2018.01)
(Continued)

(52) U.S. Cl.
CPC .............. *C09J 11/06* (2013.01); *C08K 3/016* (2018.01); *C09J 11/04* (2013.01); *C09J 163/00* (2013.01)

(58) Field of Classification Search
CPC combination set(s) only.
See application file for complete search history.

(56) References Cited

U.S. PATENT DOCUMENTS

| 2005/0075442 A1 | 4/2005 | Titelman et al. |
| 2006/0128866 A1 | 6/2006 | Diakoumakos et al. |

(Continued)

FOREIGN PATENT DOCUMENTS

| CN | 1617906 A | 5/2005 |
| CN | 1747992 A | 3/2006 |

(Continued)

OTHER PUBLICATIONS

Search Report & Written Opinion dated Feb. 24, 2021, Application No. PCT/EP2020/081595.

(Continued)

*Primary Examiner* — Peter A Salamon
(74) *Attorney, Agent, or Firm* — The Dobrusin Law Firm, P.C.

(57) ABSTRACT

The invention relates to a potting paste composition for honeycomb reinforcement having improved fire retardancy characteristics. The potting paste composition comprises (a) a curable polymer; (b) a curing agent for the curable polymer; (c) a fire retardant comprising an ammonium polyphosphate in combination with an ingredient selected from the group consisting of metal hydroxides, expandable graphites, liquid phosphate esters, phosphorous organic compounds or salts thereof, and zeolites; and (d) a filler selected from the group consisting of polymeric microspheres, hollow glass microspheres, and thixotropic fillers; wherein the potting paste has an uncured density determined by the method according to EN ISO 1183 of not more than 0.7100 g/cm$^3$, preferably of at most 0.680 g/cm$^3$, more preferably of at most 0.673 g/cm$^3$, still more preferably of at most 0.660 g/cm$^3$, even more preferably of at most 0.658 g/cm$^3$, yet more preferably of at most 0.653 g/cm$^3$ and in particular of at most 0.620 g/cm$^3$; and wherein the total content of the fire retardant is at least 5.0 wt.-%, preferably (Continued)

Figure 1:
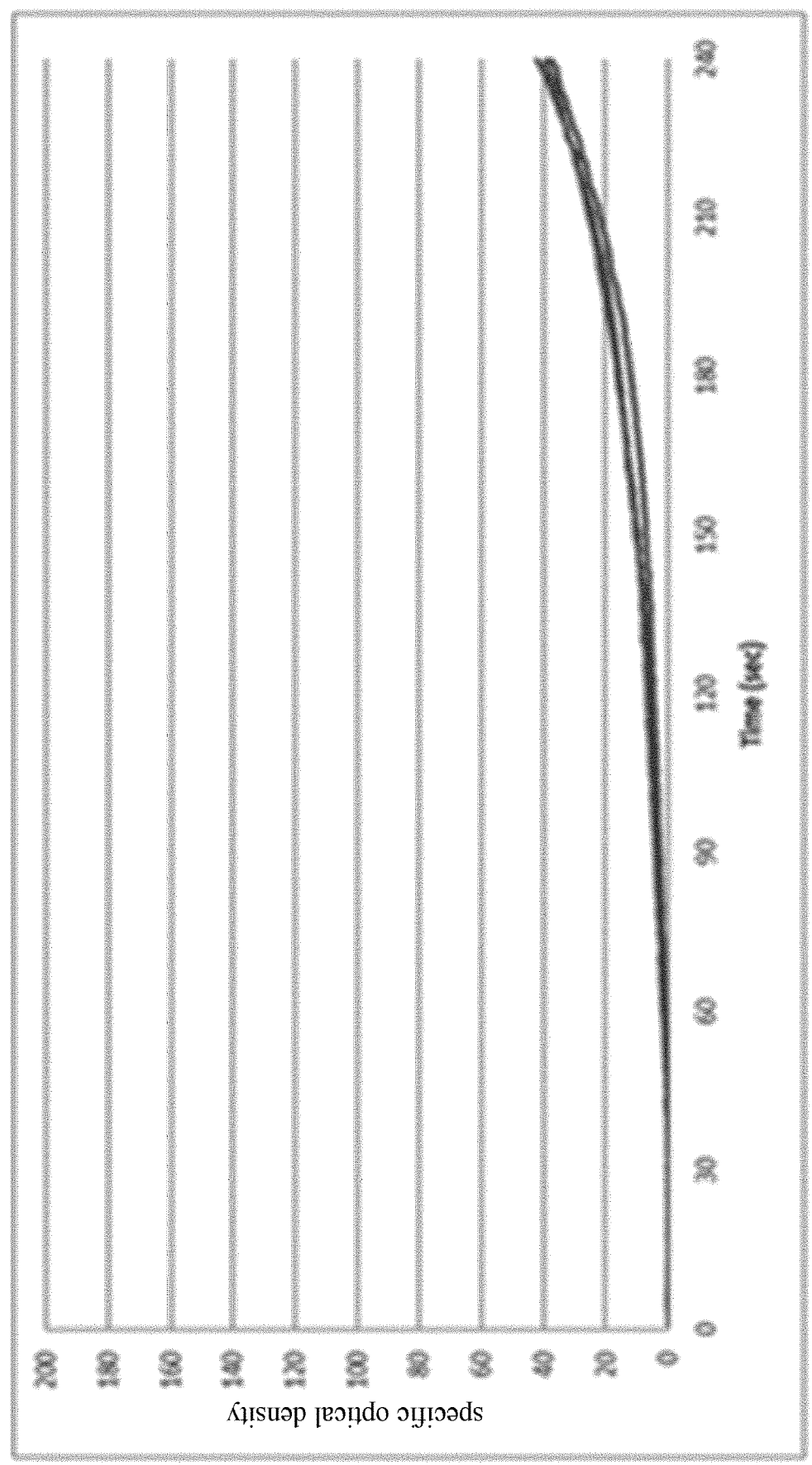

at least 10 wt.-%, more preferably at least 15 wt.-%, relative to the total weight of the potting paste composition.

20 Claims, 2 Drawing Sheets

(51) Int. Cl.
*C09J 11/04* (2006.01)
*C09J 163/00* (2006.01)

(56) References Cited

U.S. PATENT DOCUMENTS

| | | | |
|---|---|---|---|
| 2007/0131589 A1* | 6/2007 | Weston | C10L 3/103 |
| | | | 208/213 |
| 2008/0167412 A1 | 7/2008 | Elgimiabi et al. | |
| 2011/0288210 A1* | 11/2011 | Pinnavaia | C08K 3/26 |
| | | | 524/424 |
| 2012/0153242 A1 | 6/2012 | Le Bonte et al. | |
| 2018/0037695 A1* | 2/2018 | Czaplicki | C08G 59/1488 |
| 2021/0054239 A1* | 2/2021 | Huther Ebersohl | C09J 163/00 |
| 2021/0395478 A1 | 12/2021 | Czaplicki | |
| 2022/0025172 A1 | 1/2022 | Czaplicki | |
| 2022/0089859 A1 | 3/2022 | Czaplicki | |
| 2024/0287246 A1 | 8/2024 | Czaplicki | |

FOREIGN PATENT DOCUMENTS

| | | | | |
|---|---|---|---|---|
| CN | 107652930 A | | 2/2018 | |
| EP | 0459951 A2 | * | 4/1991 | ............ C08L 63/00 |
| EP | 0814121 A1 | | 12/1997 | |
| EP | 1674518 A1 | | 6/2006 | |
| EP | 2818490 A1 | | 12/2014 | |
| JP | 1998101836 A | | 9/1996 | |
| JP | 2001081223 A | | 3/2001 | |
| WO | 2008/045270 A1 | | 4/2008 | |
| WO | 2010/149353 A1 | | 12/2010 | |
| WO | 2016/196778 A1 | | 12/2016 | |
| WO | WO-2019170747 A1 | * | 9/2019 | ............ C04B 28/34 |

OTHER PUBLICATIONS

Japanese 1st Office Action dated Mar. 2, 2023 (Application No. 2021- 523472).
Japanese 2nd office action dated Nov. 17, 2023 (Application No. 2021-523472).
Chinese Office Action dated Dec. 4, 2023, Application No. 202080092839.6.
International Preliminary Report on Patentability dated May 17, 2022, Application No. PCT/EP2020/081595.
Chinese Third Office Action dated Oct. 31, 2024, Application No. 202080092839.6.

* cited by examiner

POTTING PASTE FOR HONEYCOMB REINFORCEMENT

Priority is claimed to European patent application no. 19 208 849.0 filed on Nov. 13, 2020.

The invention relates to a potting paste composition for honeycomb reinforcement having improved fire retardancy characteristics. The potting paste composition comprises (a) a curable polymer; (b) a curing agent for the curable polymer; (c) a fire retardant comprising an ammonium polyphosphate in combination with an ingredient selected from the group consisting of metal hydroxides, expandable graphites, liquid phosphate esters, phosphorous organic compounds or salts thereof, and zeolites; and (d) a filler selected from the group consisting of polymeric microspheres, hollow glass microspheres, and thixotropic fillers; preferably wherein the potting paste has an uncured density determined by the method according to EN ISO 1183 of not more than 0.7100 g/cm$^3$, preferably of at most 0.680 g/cm$^3$, more preferably of at most 0.673 g/cm$^3$, still more preferably of at most 0.660 g/cm$^3$, even more preferably of at most 0.658 g/cm$^3$, yet more preferably of at most 0.653 g/cm$^3$ and in particular of at most 0.620 g/cm$^3$; and wherein the total content of the fire retardant is at least 5.0 wt.-%, preferably at least 10 wt.-%, more preferably at least 15 wt.-%, relative to the total weight of the potting paste composition. The potting paste composition is preferably a one-component pumpable epoxy-based potting paste composition.

There is an ongoing need in many industries (e.g., transportation, such as in marine craft, rail cars, automotive vehicles, aircraft, or otherwise; building construction) for improved compositions that exhibit flame retardancy, ease of use, relatively good performance for their intended purposes, and/or reduction in the number of steps needed for processing the compositions for their intended use. Examples of such applications include adhesive or other compositions for use in potting, edge close-out, local reinforcement, and/or core splices of one or more bodies, such as a body having hollow sections, cavities, and/or void-containing structures. One such body is a honeycomb structure panel of a type commonly employed in aerospace applications.

While many existing compositions meet some of the above needs, there continues to be a need for improved materials that simplify manufacture and/or use of the compositions, which help reduce the amount of such compositions that are needed, or that meet some other need. There is especially a need for additional materials that offer an appropriate balance of viscosity (e.g. to allow for filling of cavities, or other voids, or to otherwise permit ready ability for handling during its working life), and good resulting strength and/or modulus characteristics (e.g. in compression) upon cure.

Several honeycomb reinforcing pastes are commercially available (e.g. Cytec BR623P4 and 3M® SW EC-3450 FST) but none provides a desirable combination of properties, especially low smoke opacity, low smoke toxicity, high mechanical properties and low health risks.

Rigorous fire regulations are imposed on materials used in the transportation industries and in particular on materials used in aircraft. Reduced flammability, fire retardancy, reduction in smoke density, reduction in smoke toxicity, low heat release on burning are important for materials that are used in transportation vehicles. In particular, materials that are used inside the pressurized section of the fuselage of an aircraft should comply with the requirements of the Federal Aviation Authority (FAA) tests for fire, smoke and toxicity FAR Part 25 .sctn.25.853 (a) and heat release FAR Part 25.sctn.25.853 (d).

The use of various flame retardants (fire retardants) and combinations thereof is also known from the prior art. Known flame retardants includes halogenated polymers, other halogenated materials, materials (e.g. polymers) including red phosphorous, bromine, chlorine, oxide, combinations thereof or the like. Exemplary flame retardants include, without limitation, chloroalkyl phosphate, dimethyl methylphosphonate, bromine-phosphorus compounds, neopentylbromide polyether, brominated polyether, antimony oxide, zinc borate, calcium metaborate, chlorinated paraffin, brominated toluene, hexabromobenzene, antimony trioxide, graphite (e.g. expandable graphite), combinations thereof or the like.

Further, strict health and environmental protection regulations are imposed on materials used in the transportation industries and in particular on materials used in aircraft. Thus, it can accordingly be detrimental if these materials contain constituents that are classified as e.g. causing skin irritation (H315), potentially causing an allergic skin reaction (H317), causing serious eye damage (H318), causing serious eye irritation (H319), being harmful if inhaled (H332), potentially causing allergy or asthma symptoms or breathing difficulties if inhaled (H334), being very toxic to aquatic life (H400), being harmful to aquatic life with long lasting effects (H411 or H412), and the like. These risks become even worse when one must consider situations where such materials are exposed to heavy fires.

For example, red phosphorus (CAS 7723-14-0) is considered fatal if inhaled, causes severe skin burns and eye damage, is very toxic to aquatic life and catches fire spontaneously if exposed to air. Further, combustion by-products of red phosphorous include highly toxic phosphine gas. Zinc borate (CAS 1332-07-6) is even suspected of damaging fertility or the unborn child.

Likewise, some curing agents like 1,2,3,6-tetrahydromethyl-3,6-methanophthalic anhydride (CAS 25134-21-8) are considered harmful if swallowed, causes serious eye damage, causes skin irritation, may cause an allergic skin reaction and may cause allergy or asthma symptoms or breathing difficulties if inhaled.

EP 2 818 490 relates to a curable compositions comprising (i) at least one epoxy resin comprising at least one aromatic moiety or a moiety derivable by hydrogenating an aromatic moiety and wherein the epoxy resin does not contain an aromatic amine moiety, (ii) an epoxide hardener system comprising (a) a carboxylic acid anhydride, (b) a first amine having a melting point from about 30° C. to about 100° C. and containing at least one primary amine group; and (c) a second amine having a melting point of from about 50° C. to about 180° C. and having at least one primary amine group, wherein the first and second amines are selected such that they have a difference in melting points of at least 10° C. and wherein the first and second amines are contained in minor amounts by weight as compared to the carboxylic acid anhydride; (iii) a filler capable of reducing the density of the curable composition and, optionally, (iv) a fire retardant system that includes a mixture of: (a) at least one compound selected from the group comprising alkaline earth metal hydroxides and aluminum group hydroxides, and (b) at least one phosphorous-containing material, furthermore, cured compositions obtainable by curing the above curable composition, the use of the curable composition for filling of voids in honeycomb structures and processes for filing voids in honeycomb structures.

EP 0 814 121 refers to processable one component precursors of low-density, fire retardant epoxy-based compositions comprising at least one epoxide compound with an epoxide functionality of at least 1, at least one epoxide hardener, at least one filler capable of reducing the density of the composition like hollow glass microspheres or blowing agents, 1-20 wt.-% of one or more heat-expandable graphite flame-retardant agents and 1-15 wt.-% of one or more flame-retardant plasticizers, preferable phosphoric or phosphonic acid esters.

EP 0 459 951 relates to a one component epoxy resin composition comprising: a) a multifunctional epoxide component, b) a hardener obtained by the reaction of approximately equimolar proportions of an anhydride selected from the group consisting of phthalic anhydride, hexahydrophthalic anhydride, tetrahydrophthalic anhydride, methyl tetrahydrophthalic anhydride, polyazelaic anhydride, succinic anhydride and dodecenylsuccinic anhydride with polyamine selected from the group consisting of ethylene diamine, diethylene triamine, triethylene tetramine, 1,3-diaminopropane, 1,6-diaminohexane, imino bis(propylamine) and methyl imino bis(propylamine) and c) one or more nonhalogenated flame retardants. The material forms char, as char formation is said to be recognized as an important factor in imparting flame retardancy. The char forming nonhalogenated flame retardant epoxy compositions provide epoxy systems with flame retardancy without the addition of traditional halogenated flame retardants and result in char formation upon ignition.

EP 1 674 518 relates to a curable precursor of a fire-retardant, low-density and essentially halogen-free epoxy composition comprising (i) 10 to 70 weight percent of at least one organic epoxide compound with an epoxide functionality of at least one, (ii) 1 to 55 weight percent of at least one epoxide hardener, (iii) 5 to 50 weight percent of an essentially halogen-free fire-retardant system that includes a mixture of: (1) at least one compound selected from the group comprising alkaline earth metal hydroxides and aluminum group hydroxides, and (2) at least one phosphorous-containing material, (iv) 10 to 60 weight percent of a filler system capable of reducing the density of the precursor that includes a mixture of (1) at least one low-density inorganic filler having a density of between 0.1 to 0.5 g cm$^{-3}$, (2) at least one low-density organic filler having a density of between 0.01 to 0.30 g/cm$^{-3}$ and being compressible.

WO 2008/045270 relates to compositions useful as adhesives and more particularly to the preparation of heat-curable epoxy-based adhesive compositions that are capable of being easily pumped under high shear at temperatures around room temperature but are resistant to being washed off substrate surfaces prior to being cured.

WO 2016/196778 relates generally to a one component epoxy-based potting paste composition, comprising: at least about 20 wt.-% of a liquid epoxy resin; an amount of a halogen-free flame retardant sufficient so that the resulting cured adhesive composition exhibits sufficient flame retardancy for a vertical burn length of less than 6 inches according to FAR 25,853; at least two curing agents; and a lightweight low-density filler.

WO 2019/170747 relates to a heat-activatable foamable honeycomb core splice adhesive having improved fire retardancy, particularly with respect to smoke toxicity and smoke opacity (smoke density). The core splice adhesive is provided in form of a foamable film, whereas honeycomb reinforcing pastes must have fundamentally different properties; honeycomb reinforcing pastes are typically non-foamable pastes.

The properties of the honeycomb reinforcing pastes of the prior art are not satisfactory in every respect and there is a demand for improved honeycomb reinforcing pastes.

It is an object of the invention to provide potting paste compositions that have advantages compared to the honeycomb reinforcing pastes of the prior art particularly with respect to fire retardancy. The potting paste compositions should preferably have improved smoke toxicities and/or improved smoke opacities (smoke densities). The improved smoke toxicities and/or improved smoke opacities (smoke densities) should not rely upon char formation and dangerous substances such as red phosphorous should not be contained.

This object has been achieved by the subject-matter of the patent claims.

It has been surprisingly found that specific combinations of compounds provide fire retardants providing the potting paste compositions with improved fire retardancy, especially with respect to smoke toxicity and/or smoke opacity (optical smoke density), and additionally may impart the potting paste composition its paste-like consistency.

Figure 2:
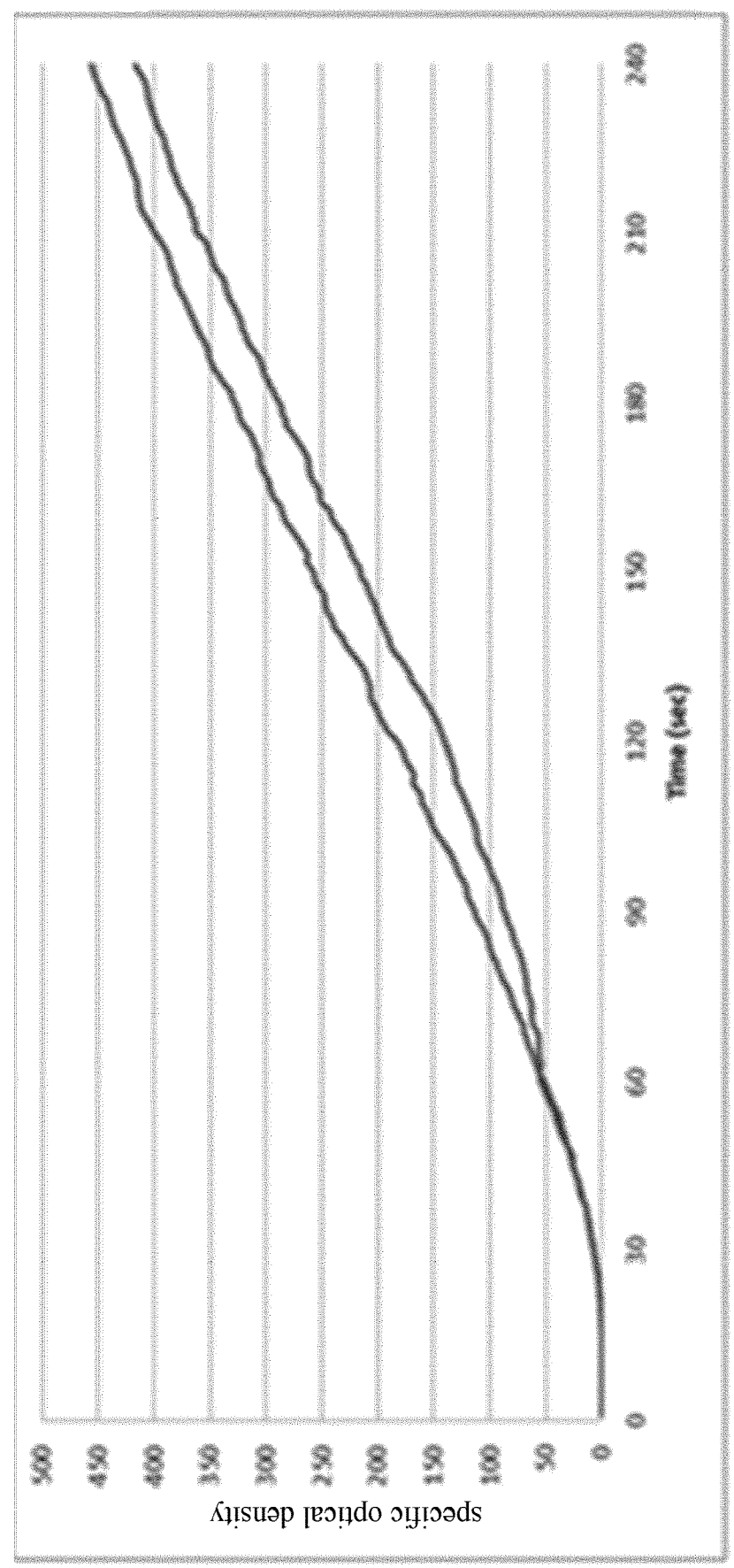

FIGS. 1 and 2 show results of the measurements of smoke density (FIG. 1, composition of Example 6; FIG. 2, composition Example 10).

A first aspect of the invention relates to a potting paste composition comprising
 (a) a curable polymer;
 (b) a curing agent for the curable polymer;
 (c) a fire retardant comprising
   an ammonium polyphosphate in combination with
   an ingredient selected from the group consisting of metal hydroxides, expandable graphites, liquid phosphate esters, phosphorous organic compounds or salts thereof, and zeolites; and
 (d) a filler selected from the group consisting of polymeric microspheres, hollow glass microspheres, and thixotropic fillers;
 preferably wherein the potting paste has an uncured density determined by the method according to EN ISO 1183 of not more than 0.7100 g/cm$^3$, preferably of at most 0.680 g/cm$^3$, more preferably of at most 0.673 g/cm$^3$, still more preferably of at most 0.660 g/cm$^3$, even more preferably of at most 0.658 g/cm$^3$, yet more preferably of at most 0.653 g/cm$^3$ and in particular of at most 0.620 g/cm$^3$; and
 wherein the total content of the fire retardant is at least 5.0 wt.-%, preferably at least 10 wt.-%, more preferably at least 15 wt.-%, relative to the total weight of the potting paste composition.

Preferably, the potting paste composition according to the invention comprises
 (a) a curable polymer;
 (b) a curing agent for the curable polymer;
 (c) a fire retardant comprising
   an ammonium polyphosphate and a metal hydroxide;
   optionally, in combination with an ingredient selected from the group consisting of expandable graphites, liquid phosphate esters, phosphorous organic compounds or salts thereof, and zeolites; and
 (d) a filler selected from the group consisting of polymeric microspheres, hollow glass microspheres, and thixotropic fillers;
 preferably wherein the potting paste has an uncured density determined by the method according to EN ISO 1183 of not more than 0.7100 g/cm$^3$; and wherein the total content of the fire retardant is at least 5.0 wt.-%, relative to the total weight of the potting paste composition Preferably, the potting paste composition according to the invention is a heat curable composition. Curing may be over a period of less than 2 hours, less than 1 hour, or even less than 40 minutes. Additionally, it is possible to avoid the need for a two-part admixture and the potential inconveniences associated therewith.

Preferably, the potting paste composition according to the invention is not adhesive in the meaning of ASTM D 907-04.

Preferably, the potting paste composition according to the invention is a one-component potting paste composition. Preferably, the potting paste composition according to the invention is pumpable. Preferably, the potting paste composition according to the invention is ready-to-use.

The potting paste composition according to the invention is a low density, structural void filling material that is typically heat curable and extrudable or pumpable. It is designed for use as an insert or edge filling of honeycomb structures, i.e. on interior honeycomb sandwich structures as edge close-out, corner reinforcement, local reinforcement for mechanical fixation, complex gap or mismatch area filling, and the like. It is particularly useful to reinforce honeycomb structures, especially at locations for mechanical fixation where it is intended to drill holes or make mechanical attachments to other parts e.g. by means of screws and the like.

The potting paste composition according to the invention preferably cures under the application of heat. Preferably, the potting paste composition according to the invention is flexible and can be readily processed prior to curing and forms a rigid material upon curing.

The potting paste composition according to the invention is preferably selected so as to be heat-activatable at a desired temperature. As used herein, heat-activatable means that upon exposure to a suitable activation temperature, the potting paste composition cures and optionally also softens (e.g. melts).

In a preferred embodiment, the potting paste composition has a post-cure glass transition temperature that is greater than any temperatures to which the potting paste composition may be exposed while in its intended environment of use (e.g. in an airplane or automotive vehicle). Exemplary post-cure glass transition temperatures may be at least about 80° C. and more preferably at least about 100° C. Other desired characteristics of the potting paste composition might include good adhesion retention and degradation resistance particularly in adverse environments such as highly variable temperature environments, high dynamic activity environments, combinations thereof or the like.

The potting paste composition may be a thermoplastic, a thermoset or a blend thereof. According to one embodiment, the potting paste composition is as an epoxy-containing material, an ethylene-containing polymer, an acetate or acrylate containing polymer, or a mixture thereof, which when compounded with the curing agent cures in a reliable and predictable manner upon the application of heat. Thus, according to one preferred embodiment, an exemplary potting paste composition may be a heat-activatable epoxy-based resin. Generally, it is contemplated that it may include or be based upon an elastomer (e.g. a rubber), an acetate, an acrylate or combinations thereof.

From a chemical standpoint, the potting paste composition is usually initially processed as a thermoplastic material before curing. After curing, the potting paste composition preferably becomes a thermoset material that is fixed and incapable of any substantial flow. It is also contemplated that the potting paste composition may comprise fibers such as glass fibers, carbon fibers or polyamide fibers such as aramid fibers.

The potting paste composition is preferably heat-activatable. Preferably, heat-activation takes place during applications where in the course of a manufacturing processing the honeycomb panel is anyway exposed to elevated temperatures for other reasons, e.g. in order to adhere the face sheets to the honeycomb core.

Therefore, an important consideration involved with the design and formulation of the potting paste composition can be the temperature at which the material cures (activation temperature). In most applications, it is undesirable for the potting paste composition to activate at room temperature or the ambient temperature in a production or assembly environment. Preferably, it is desirable for the potting paste composition to activate at higher processing temperatures.

The activation temperatures for curing may differ from one another, e.g. when the potting paste composition contains two different curing agents and/or two different curable polymers having different curing temperatures, a first curing process may take place at a first activation to cure temperature, whereas a second curing process may take place at a second activation to cure temperature.

Unless expressly stated otherwise, the term "activation temperature" refers to any activation temperature, i.e. to any activation to cure temperature(s).

In the potting paste composition according to the invention, the curable polymer reacts with the curing agent for the curable polymer at an activation temperature preferably above room temperature.

The activation temperature is preferably at least about 50° C., more preferably at least about 70° C., still more preferably at least about 90° C. and even more preferably at least about 110° C., and preferably not more than about 310° C., more preferably not more than about 290° C., still more preferably not more than about 270° C. and even more preferably not more than about 250° C.

As already mentioned above, the potting paste composition may have different activation temperatures. Preferably, said different activation temperatures independently of one another are within the ranges specified above. Preferably any of said different activation temperatures lies within a relative temperature range of preferably not more than about 70° C., more preferably not more than about 60° C., still more preferably not more than about 50° C., and even more preferably not more than about 40° C. Thus, for example, when the relative temperature range is not more than 70° C. and the highest absolute activation temperature of the potting paste composition is e.g. 183° C., the lowest absolute activation temperature of the potting paste composition is at least 113° C. (183° C.-70° C.).

Exposure to activation temperature(s) preferably occurs for a period of time that is at least about 10 minutes or less, more preferably at least about 20 minutes and even more preferably at least about 30 minutes, and preferably not more than about 300 minutes or greater, more preferably not more than about 180 minutes and even more preferably not more than about 90 minutes.

In a preferred embodiment, the potting paste composition is heat activated in a panel press. The panel structure containing the potting paste composition is fed to a panel press where it experiences temperatures that are preferably of at least about 65° C., more preferably at least about 95° C. and even more preferably at least about 130° C., and preferably not more than about 290° C., more preferably not more than about 215° C. and even more preferably not more than about 180° C., which cause the potting paste composition to cure. While in the press, a pressure is preferably applied to the panel structure urging the components of the panel structure toward each other.

Although the potting paste composition is preferably heat-activatable, it may be otherwise additionally activated by other stimuli to cure, bond, combinations thereof or the like. Without limitation, such potting paste composition may be activated by alternative stimuli such as, pressure, moisture, chemicals, ultraviolet radiation, electron beam, induction, electromagnetic radiation or by other ambient conditions.

It is additionally contemplated that other additional or alternative techniques may be used to process the panel structure. Such techniques can include vacuum forming and baking, autoclaving and pressure, others or combinations thereof. Such techniques can assist in forming panels with contours. Heats and time period for these techniques can be the same as those discussing above or may be different depending upon the activatable material used.

For allowing application of the potting paste composition according to the aforementioned protocols, particularly the manual applications, although the automated and applicator techniques may be used as well, it is preferably desirable for the potting paste composition to exhibit certain desirable properties. As suggested, it is generally desirable for the potting paste composition, prior to activation, to be generally flexible or ductile. After activation of the potting paste composition, it is preferable, although not required, for the cured material to have relatively high strength.

The potting paste according to the invention has an uncured density determined by the method according to EN ISO 1183 of not more than 0.7100 g/cm$^3$.

According to the general knowledge in the art, the term "uncured density" typically refers to the density prior to activation (sometimes also referred to as "green state density").

The potting paste composition according to the invention has preferably an uncured density within the range of from about 0.48 g/cm$^3$ to about 0.71 g/cm$^3$, more preferably from about 0.55 g/cm$^3$ to about 0.69 g/cm$^3$ and most preferably from about 0.60 g/cm$^3$ to about 0.68 g/cm$^3$.

Preferably, the potting paste composition has an uncured density of at most 0.680 g/cm$^3$, more preferably of at most 0.673 g/cm$^3$, still more preferably of at most 0.660 g/cm$^3$, even more preferably of at most 0.658 g/cm$^3$, yet more preferably of at most 0.653 g/cm$^3$ and in particular of at most 0.620 g/cm$^3$.

After curing, the potting paste composition according to the invention has preferably a density within the range of from about 0.48 g/cm$^3$ to about 0.71 g/cm$^3$, more preferably from about 0.50 g/cm$^3$ to about 0.70 g/cm$^3$ and most preferably from about 0.60 g/cm$^3$ to about 0.69 g/cm$^3$.

Prior to heat activation, the potting paste composition according to the invention is storage stable under ambient conditions (e.g. 23° C. and 50% r.h.). Thus, the potting paste composition according to the invention may be stored under ambient conditions without being activated prematurely. Preferably, the potting paste composition according to the invention is storage stable under ambient conditions for at least one day, more preferably at least two days, still more preferably at least three days, even more preferably at least one week, most preferably more than one week, and in particular at least one month.

It is contemplated that the potting paste composition according to the invention may be stored at low temperatures (e.g. 4° C. or −18° C.) in order to even further improve storage stability.

The potting paste compositions of the invention preferably exhibit storage stability under refrigerated conditions (e.g., at a temperature in the range of about −15° C. to about 15° C.) in a sealed container (e.g. sealed from one or more of light, oxygen, moisture, heat) for a period of at least about one month, 3 months, 6 months or at least about 1 year (e.g. a storage stability of about 1 month to about 2 years). During such period of storage stability the time of the working life, the time to cure to a fully cured state, or both, of the potting paste compositions will be within 25% of the working life and/or time to cure to a fully cured state, at the time the composition is prepared.

The potting paste composition is a paste, i.e. a semisolid material. For the purpose of the invention, a paste is generally regarded as a substance that behaves as a solid until a sufficiently large load or stress is applied, at which point it flows like a fluid. In rheological terms, a paste is an example of a Bingham plastic fluid. Pastes typically consist of a suspension of granular material in a background fluid. The individual grains are jammed together, forming a disordered, glassy or amorphous structure, and giving pastes their solid-like character. Thus, by definition, the potting paste composition according to the invention is not a liquid.

During activation, the potting paste composition according to the invention preferably exhibits no exudation.

During activation, the potting paste composition according to the invention preferably has a volatile content of not more than about 4.0%, more preferably not more than about 3.5%, still more preferably not more than about 3.0%, yet more preferably not more than about 2.5%, even more preferably not more than about 2.0%, most preferably not more than about 1.5%, and in particular not more than about 1.0%, in each case when being tested in accordance with DIN 65064 Section 6.1.3.1.

During activation at 120° C., the potting paste composition according to the invention preferably has an exothermicity within the range of from about 45° C. to about 75° C., more preferably from about 48° C. to about 72° C., still more preferably from about 50° C. to about 70° C., yet more preferably from about 52° C. to about 68° C., even more preferably from about 54° C. to about 66° C., most preferably from about 56° C. to about 64° C., and in particular from about 58° C. to about 62° C., in each case when being tested in accordance with DIN 65064 Section 6.1.3.2. When curing is done at 175° C., preferred exothermicity is less than 25° C., more preferably at most 23° C., still more preferably at most 21° C., yet more preferably at most 19° C., even more preferably at most 17° C., most preferably at most 15° C., and in particular at most 13° C.

At a temperature of −55° C., the activated potting paste composition preferably has a compressive strength within the range from about 20 MPa to about 60 MPa, more preferably from about 25 MPa to about 55 MPa, still more preferably from about 30 MPa to about 50 MPa, and most preferably from about 35 MPa to about 45 MPa, in each case when being tested in accordance with ASTM D695, preferably at a sample density of 0.64±0.10 g/cm$^3$, preferably 0.64±0.05 g/cm$^3$.

At a temperature of 23° C., the activated potting paste composition preferably has a compressive strength within the range from about 10 MPa to about 100 MPa, more preferably from about 20 MPa to about 80 MPa, still more preferably from about 30 MPa to about 60 MPa, and most preferably from about 30 MPa to about 40 MPa, in each case when being tested in accordance with ASTM D695, preferably at a sample density of 0.64±0.10 g/cm$^3$, preferably 0.64±0.05 g/cm$^3$.

Preferably, the potting paste composition has a compressive strength at room temperature determined according to ASTM D695 of at least 30 MPa, preferably of at least 32 MPa, more preferably of at least 35 MPa.

At a temperature of 85° C., the activated potting paste composition preferably has a compressive strength within the range from about 5 MPa to about 30 MPa, more preferably from about 10 MPa to about 25 MPa, still more preferably from about 12 MPa to about 23 MPa, and most preferably from about 15 MPa to about 20 MPa, in each case when being tested in accordance with ASTM D695, preferably at a sample density of 0.64±0.10 g/cm$^3$, preferably 0.64±0.05 g/cm$^3$.

At a temperature of 23° C., the activated potting paste composition preferably has a compressive modulus within the range from about 1000 MPa to about 2500 MPa, more preferably from about 1200 MPa to about 2300 MPa, still more preferably from about 1400 MPa to about 2100 MPa, and most preferably from about 1500 MPa to about 2000 MPa, in each case when being tested in accordance with ASTM D695, preferably at a sample density of 0.64±0.10 g/cm$^3$, preferably 0.64±0.05 g/cm$^3$.

Preferably, the potting paste composition has a compressive modulus at room temperature determined according to ASTM D695 of at least 1100 MPa, preferably of at least 1200 MPa, more preferably of at least 1400 MPa, still more preferably of at least 1700 MPa, most preferably of at least 1800 MPa.

Preferably, the compositions of the invention, in a cured state also pass one or any combination of the 12 second Vertical Burn test per 14 C.F.R. § 25.853 App. F Part I (a)(1)(ii); 60 second Vertical Burn test per 14 C.F.R. § 25.853 App. F Part 1(a)(1)(i); Smoke Density per 14 C.F.R. § 25.853 App. F Part V, or Smoke Toxicity per AITM 3.0005.

The potting paste composition according to the invention exhibits excellent fire retardancy, especially flame retardancy, smoke density (smoke opacity) and smoke toxicity.

Preferably, at a sample thickness of 3 mm and after a curing cycle under curing conditions comprising (i) an initial dynamic heating period from room temperature to a temperature of 125° C. at a heating rate of 3° C./min and (ii) a subsequent constant heating period of 55 minutes at a temperature of 125° C., the potting paste composition according to the invention exhibits in the vertical burn test, 12 seconds in accordance with FAR 25 Appendix F Part 1 (a)(1)(ii)/AITM 2.0002 B, a maximum burn length of not more than about 160 mm, more preferably not more than about 140 mm, still more preferably not more than about 120 mm, and most preferably not more than about 100 mm.

Preferably, at a sample thickness of 3 mm and after a curing cycle under curing conditions comprising (i) an initial dynamic heating period from room temperature to a temperature of 125° C. at a heating rate of 3° C./min and (ii) a subsequent constant heating period of 55 minutes at a temperature of 125° C., the potting paste composition according to the invention exhibits in the vertical burn test, 12 seconds in accordance with FAR 25 Appendix F Part 1 (a)(1)(ii)AITM 2.0002 B, an after flame time of not more than about 6 seconds, more preferably not more than about 4 seconds, still more preferably not more than about 2 seconds, and most preferably about 0 seconds.

Preferably, at a sample thickness of 3 mm and after a curing cycle under curing conditions comprising (i) an initial dynamic heating period from room temperature to a temperature of 125° C. at a heating rate of 3° C./min and (ii) a subsequent constant heating period of 55 minutes at a temperature of 125° C., the potting paste composition according to the invention exhibits in the vertical burn test, 12 seconds in accordance with FAR 25 Appendix F Part 1 (a)(1)(ii)/AITM 2.0002 B, a dripping time of not more than about 1.5 seconds, more preferably not more than about 1.0 seconds, still more preferably not more than about 0.5 seconds, and most preferably about 0 seconds.

Preferably, at a sample thickness of 3 mm and after a curing cycle under curing conditions comprising (i) an initial dynamic heating period from room temperature to a temperature of 125° C. at a heating rate of 3° C./min and (ii) a subsequent constant heating period of 55 minutes at a temperature of 125° C., the potting paste composition according to the invention exhibits in the vertical burn test, 60 seconds in accordance with FAR 25 Appendix F Part 1 (a)(1)(i)/AITM 2.0002 A, of below 152 mm, more preferably not more than 150 mm, even more preferably not more than 140 mm, still more preferably not more than 130 mm, yet more preferably not more than 100 mm, most preferably not more than 80 mm and in particular not more than 60 mm.

Preferably, at a sample thickness of 3 mm and after a curing cycle under curing conditions comprising (i) an initial dynamic heating period from room temperature to a temperature of 125° C. at a heating rate of 3° C./min and (ii) a subsequent constant heating period of 55 minutes at a temperature of 125° C., the potting paste composition according to the invention exhibits in the vertical burn test, 60 seconds in accordance with FAR 25 Appendix F Part 1 (a)(1)(i)/AITM 2.0002 A, an after flame time of below 6 seconds, more preferably not more than about 5 seconds, even more preferably not more than 4 seconds, still more preferably not more than about 2 seconds, and most preferably about 0 seconds.

Preferably, at a sample thickness of 3 mm and after a curing cycle under curing conditions comprising (i) an initial dynamic heating period from room temperature to a temperature of 125° C. at a heating rate of 3° C./min and (ii) a subsequent constant heating period of 55 minutes at a temperature of 125° C., the potting paste composition according to the invention exhibits in the vertical burn test, 60 seconds in accordance with FAR 25 Appendix F Part 1 (a)(1)(i)/AITM 2.0002 A, a dripping time of not more than about 1.5 seconds, more preferably not more than about 1.0 seconds, still more preferably not more than about 0.5 seconds, and most preferably about 0 seconds.

Preferably, at a sample thickness of 3 mm and after a curing cycle under curing conditions comprising (i) an initial dynamic heating period from room temperature to a temperature of 125° C. at a heating rate of 3° C./min and (ii) a subsequent constant heating period of 55 minutes at a temperature of 125° C., the potting paste composition according to the invention exhibits in accordance with JAR/FAR 25.853 AITM 2.0007 Å flaming modes, an optical smoke density $D_s$ of below 200, more preferably not more than 180, even more preferably not more than 160, still more preferably not more than 140 and most preferably not more than 120.

Preferably, at a sample thickness of 3 mm and after a curing cycle under curing conditions comprising (i) an initial dynamic heating period from room temperature to a temperature of 125° C. at a heating rate of 3° C./min and (ii) a subsequent constant heating period of 55 minutes at a temperature of 125° C., the potting paste composition according to the invention exhibits a smoke toxicity in accordance with AITM 3.0005 with respect to

- HF: preferably not more than about 60 ppm, more preferably not more than about 40 ppm, still more preferably not more than about 20 ppm, and most preferably about 0 ppm; and/or
- HCl: preferably not more than about 60 ppm, more preferably not more than about 40 ppm, still more preferably not more than about 20 ppm, and most preferably about 0 ppm; and/or
- NOx: preferably not more than about 100 ppm, more preferably not more than about 90 ppm, still more preferably not more than about 80 ppm, and most preferably not more than about 70 ppm; and/or
- $SO_2$: preferably not more than about 70 ppm, more preferably not more than about 50 ppm, still more preferably not more than about 30 ppm, and most preferably not more than about 10 ppm; and/or
- HCN: preferably not more than about 90 ppm, more preferably not more than about 70 ppm, still more preferably not more than about 50 ppm, and most preferably not more than about 30 ppm.

The potting paste composition according to the invention comprises as component (a) a curable polymer.

The curable polymer is capable of reacting with component (b), i.e. with the curing agent for the curable polymer, wherein reaction typically takes place at the activation temperature. Thus, the curable polymer typically comprises reactive functional groups that are capable of reacting with compatible reactive functional groups of the curing agent under suitable reaction conditions. Preferably, the reaction of the curable polymer (a) with the curing agent (b) causes cross-linking thereby rendering the potting paste composition a thermoset material.

The curable polymer may be a single species or a mixture of two curable polymers that are capable of reacting with the curing agent (b). It is also contemplated that the potting paste composition comprises two curable polymers and two curing agents, wherein a first curable polymer is capable of reacting with a first curing agent, whereas a second curable polymer is capable of reacting with a second curing agent without interference of the two curing reactions.

The curable polymer may include a variety of different polymers, independently of one another selected from the group consisting of functionalized thermoplastics, elastomers, plastomers combinations thereof or the like. For example, and without limitation, polymers that might be appropriately incorporated into the potting paste composition include halogenated polymers, polycarbonates, polyketones, urethanes, polyesters, silanes, sulfones, allyls, olefins, styrenes, acrylates, methacrylates, epoxies, silicones, phenolics, rubbers, polyphenylene oxides, terephthalates, acetates (e.g. EVA), acrylates, methacrylates (e.g. ethylene methyl acrylate polymer) or mixtures thereof.

Further, curable polymer may include a variety of different polymers, independently of one another selected from the group consisting of functionalized polyolefins (e.g., polyethylene, polypropylene), polystyrenes, polyacrylates, poly(ethylene oxides), poly(ethyleneimines), polyesters, polyurethanes, polysiloxanes, polyethers, polyphosphazines, polyamides, polyimides, polyisobutylenes, polyacrylonitriles, poly(vinyl chlorides), poly(methyl methacrylates), poly(vinyl acetates), poly(vinylidene chlorides), polytetrafluoroethylenes, polyisoprenes, polyacrylamides, polyacrylic acids, and/or polymethacrylates.

The potting paste composition may comprise up to about 85 wt.-% or greater of curable polymer(s), relative to the total weight of the potting paste composition. Preferably, the potting paste composition comprises about 0.1 wt.-% to about 85 wt.-%, more preferably about 1 wt.-% to about 70 wt.-% of curable polymer(s), in each case relative to the total weight of the potting paste composition.

Preferably, the potting paste composition has a content of curable polymer, relative to the total weight of the potting paste composition, within the range of from 20 wt.-% to 50 wt.-%, preferably within the range of from 25 wt.-% to 45 wt.-%, most preferably within the range of from 30 wt.-% to 40 wt.-%, in each case relative to the total weight of the potting paste composition.

When the potting paste composition according to the invention contains two or more curable polymers, the total content refers to the total amount of all curable polymers that are contained in the potting paste composition.

In a preferred embodiment, the curable polymer (a) comprises or essentially consists of one epoxy resin.

In a particularly preferred embodiment, the curable polymer (a) comprises or essentially consists of two epoxy resins.

In a particularly preferred embodiment, the potting paste composition is a one component heat curable composition. The composition may be a one-component epoxy-based potting paste composition. The composition may include an epoxy resin.

Epoxy resin is used herein to mean any of the conventional dimer, oligomer or polymer containing at least one epoxy functional group. The curable polymer may have one or more oxirane rings polymerizable by a ring opening reaction. It is contemplated that the potting paste composition can include up to about 80 wt.-% of an epoxy resin or more, relative to the total weight of the potting paste composition. Preferably, the potting paste composition includes between about 5 wt.-% and about 60 wt.-% epoxy resin and still more preferably between about 10 wt.-% and about 30 wt.-% epoxy resin, in each case relative to the total weight of the potting paste composition.

The epoxy resin may be aliphatic, cycloaliphatic, aromatic or the like. The epoxy resin may be supplied as a solid (e.g., as pellets, chunks, pieces or the like) or a liquid (e.g., an epoxy resin). The epoxy resin may include an ethylene copolymer or terpolymer that may possess an alpha-olefin. As a copolymer or terpolymer, the polymer is composed of two or three different monomers, i.e. small molecules with high chemical reactivity that are capable of linking up with similar molecules. Preferably, an epoxy resin is added to the potting paste composition to increase adhesion properties of the potting paste composition. One exemplary epoxy resin may be a phenolic resin, which may be a novolac type or other type resin. Other preferred epoxy resins containing potting paste compositions may include a bisphenol-A epichlorohydrin ether polymer, or a bisphenol-A epoxy resin which may be modified with butadiene or another polymeric additive.

In preferred embodiments, the potting paste composition contains no epoxy resin other than room temperature liquid epoxy resin.

Any suitable room temperature liquid epoxy resin may be used in the potting paste composition according to the invention. In preferred embodiments, the liquid epoxy resin is a neat room temperature liquid epoxy resin, i.e. it is a liquid at room temperature without addition of solvents or reactive diluents. In preferred embodiments, the liquid epoxy resin is an epoxy resin mixed with a reactive diluent such that it is a liquid at room temperature, i.e. an epoxy/reactive diluent room temperature liquid epoxy resin. In preferred embodiments, the potting paste composition contains no epoxy resin other than room temperature liquid epoxy resin. In preferred embodiments, the potting paste composition contains no epoxy resin other than neat room temperature liquid epoxy resin. In preferred embodiments, the potting paste composition contains no epoxy resin other than epoxy/reactive diluent room temperature liquid epoxy resin. Suitable room temperature liquid epoxy resins for use as a neat room temperature liquid epoxy resin may include bisphenol-A polyepoxide resins such as EPON 828 (Momentive Specialty Chemicals, Columbus, Ohio); D.E.R 331 (Dow Chemical Company, Midland, Mich.); bisphenol-A/F polyepoxide resins such as EPON 232 (Momentive Specialty Chemicals, Columbus, Ohio). Suitable epoxy/diluent combinations for use as epoxy/reactive diluent room temperature liquid epoxy resin may include epoxy novolac resins such as D.E.N. 438 (Dow Chemical Company, Midland, Mich.) combined with 1,4-Cyclohexandimethanol-diglycidylether; D.E.N. 431, D.E.N. 425 (Dow Chemical Company, Midland, Mich.), Epalloy 9000, Epalloy 8350 (CVC thermoset specialties, Moorestown, N.J.).

In preferred embodiments, the potting paste composition comprises at least about 35 wt.-% room temperature liquid epoxy resin, in some embodiments at least about 40 wt.-% room temperature liquid epoxy resin, and in some embodiments at least about 45 wt.-% room temperature liquid epoxy resin, in each case relative to the total weight of the potting paste composition. In preferred embodiments, the potting paste composition comprises not more than about 75 wt.-% room temperature liquid epoxy resin, in some embodiments not more than about 70 wt.-% room temperature liquid epoxy resin, in some embodiments not more than about 65 wt.-% room temperature liquid epoxy resin, in some embodiments not more than about 60 wt.-% room temperature liquid epoxy resin, and in some embodiments not more than about 55 wt.-% room temperature liquid epoxy resin, in each case relative to the total weight of the potting paste composition.

Preferably, the potting paste composition according to the invention is an epoxy-based potting paste composition, preferably a one-component epoxy-based potting paste composition, more preferably a two-component epoxy-based potting paste composition. The composition may include a liquid epoxy resin and/or a low-viscosity epoxy resin.

Preferably, the potting paste composition according to the invention is an epoxy-based potting paste composition wherein the epoxy resin is selected from the group consisting of bisphenol-F based liquid epoxy resins, epoxy phenol novolac resins having a viscosity at room temperature in the range of from 1100 mPa·s and 1700 mPa·s, and combinations thereof.

A preferred low-viscosity epoxy resin is a low-viscosity epoxy phenol novolac (EPN) resin such as Araldite EPN 9850 which is commercially available from the Huntsman Corporation, Salt Lake City, Utah.

The liquid epoxy resin may be a bisphenol-A diglycidyl ether or a bisphenol-F diglycidyl ether unmodified epoxy resin. The liquid epoxy resin may have an epoxy equivalent weight per ASTM D1652 of about 185 to about 205 grams/equivalent (g/eq). The liquid epoxy resin may have a viscosity (at 25° C., per ASTM D445) in the range of about 1000 to about 10,000 Centipoise (mPas), e.g., about 4,000 to about 7,000 mPas. Examples of commercially available liquid epoxy resins are DER 362, available from The Dow Chemical Company, Midland, Mich. and Araldite PY 306, available from the Huntsman Corporation, Salt Lake City, Utah. The liquid epoxy resin may have a maximum epoxy equivalent weight of at least about 250 grams/equivalent per ASTM D1652. The composition may include a liquid epoxy in an amount of from about 20 wt.-% to about 80 wt.-%, from about 30 wt.-% to about 70 wt.-%, or even from about 40 wt.-% to about 60 wt.-%. The liquid epoxy resin may be selected to solubilize the liquid epoxy resin with one or more of the curing agents. The liquid epoxy resin may be selected to solubilize the liquid epoxy resin with exactly one of the curing agents.

The epoxy resin may include a liquid epoxy resin. The epoxy component may be combined with one of the curing agents to solubilize the curing agent. The epoxy resin may be such that the composition of the invention exhibits, when cured, one or any combination of a relatively high compressive strength, a relatively high compressive modulus, all while exhibiting acceptable flame retardancy and a relatively low density.

The liquid epoxy resin may decrease the viscosity of the potting paste so that it is able to be more easily pumped directly into one or more honeycomb openings.

The composition may include a diluent. The epoxy resin diluent, if present, may be an aromatic monofunctional epoxy. The epoxy resin diluent may be a nonyl phenol glycidyl ether. The epoxy resin diluent may have a viscosity at 25° C. per ASTM D445 of about 80 to about 180 mPas, e.g., about 100 to 140 mPas. The epoxy resin diluent may have an epoxy equivalent weight (g/eq) per ASTM D-1652 of about 200 to about 400 mPas, e.g. about 300 to about 325 mPas. The epoxy resin diluent may be commercially available, such as Erisys GE-12, available from CVC Thermoset Specialties. Alternatively, the composition may be substantially free of any diluent.

The potting paste composition according to the present invention may preferably include a substantial amount of elastomer or rubber, which can be one elastomer or a mixture of several different elastomers. When employed, the content of the elastomer(s) is preferably at least about 5 wt.-%, more preferably at least about 14 wt.-%, even more preferably at least about 25 wt.-% and preferably not more than about 65 wt.-%, more preferably not more than about 45% and even more preferably not more than about 35 wt.-%, in each case relative to the total weight of the potting paste composition. When the elastomer does not contain functional groups that are capable of reacting with the curing agent, the weight content of the elastomer(s), if contained, does not contribute to the overall weight content of component (a), i.e. the curable polymer.

Suitable rubbers and elastomers include, without limitation, natural rubber, styrene-butadiene rubber, polyisoprene, polyisobutylene, polybutadiene, isoprene-butadiene copolymer, neoprene, nitrile rubber (e.g., a butyl nitrile, such as carboxy-terminated butyl nitrile), butyl rubber, polysulfide elastomer, acrylic elastomer, acrylonitrile elastomers, silicone rubber, polysiloxanes, polyester rubber, diisocyanate-linked condensation elastomer, EPDM (ethylene-propylene diene monomer rubbers), chlorosulphonated polyethylene, fluorinated hydrocarbons and the like. Particularly preferred elastomers are EPDMs sold under the tradename VISTALON® 7800 and 2504, commercially available from Exxon Mobil Chemical. Another preferred elastomer is a polybutene isobutylene butylenes copolymer sold under the tradename H-1500, commercially available from BP Amoco Chemicals.

An elastomer-containing adduct can also be employed in the potting paste composition of the present invention such as an epoxy/elastomer adduct. When the curable polymer comprises an epoxy resin that is capable of reacting with the curing agent, the epoxy/elastomer adduct is typically also capable of reacting with the curing agent. Thus, the weight content of the epoxy/elastomer adduct(s), if contained, contribute to the overall weight content of component (a), i.e. the curable polymer.

The elastomer-containing adduct may be included in an amount of up to about 80 wt.-% of the potting paste composition or more, relative to the total weight of the potting paste composition. More preferably, the weight content of the elastomer-containing adduct, when included, is about 20 wt.-% to about 80 wt.-%, and more preferably is about 30 wt.-% to about 70 wt.-%, in each case relative to the total weight of the potting paste composition.

In turn, the elastomer-containing adduct itself preferably is an epoxy/elastomer adduct and includes about 1:5 to 5:1 parts of epoxy resin to elastomer, and more preferably about 1:3 to 3:1 parts of epoxy resin to elastomer.

The elastomer incorporated in the elastomer-containing adduct may be a thermosetting or other elastomer. Exemplary elastomers include, without limitation natural rubber, styrene-butadiene rubber, polyisoprene, polyisobutylene, polybutadiene, isoprene-butadiene copolymer, neoprene, nitrile rubber (e.g., a butyl nitrile, such as carboxy-terminated butyl nitrile), butyl rubber, polysulfide elastomer, acrylic elastomer, acrylonitrile elastomers, silicone rubber, polysiloxanes, polyester rubber, diisocyanate-linked condensation elastomer, EPDM (ethylene-propylene diene rubbers), chlorosulphonated polyethylene, fluorinated hydrocarbons and the like. In a preferred embodiment, recycled tire rubber is employed.

The elastomer-containing adduct, when added to the potting paste composition, preferably is added to modify structural properties of the potting paste composition such as strength, toughness, stiffness, flexural modulus, or the like. Additionally, the elastomer-containing adduct may be selected to render the potting paste composition more compatible with coatings such as water-borne paint or primer system or other conventional coatings.

The potting paste composition according to the invention comprises as component (b) a curing agent for the curable polymer.

One or more curing agents and/or curing agent accelerators may be added to the curable potting paste composition. Amounts of curing agents and curing agent accelerators can vary widely within the potting paste composition depending upon the desired structural properties of the potting paste composition and the like. Exemplary ranges for the curing agents or curing agent accelerators present in the potting paste composition independently of one another range from about 0.001 wt.-% to about 30 wt.-%, relative to the total weight of the potting paste composition.

When the potting paste composition comprises more than a single curing agent and/or more than a single curing agent accelerator, the above weight content preferably refers to the total content of all curing agents and all curing agent accelerators, respectively.

Preferably, the total content of the curing agents or curing agent accelerators present in the potting paste, relative to the total weight of the potting paste composition, is within the range of from 10 wt.-% to 35 wt.-%, preferably within the range of from 15 wt.-% to 30 wt.-%, most preferably within the range of from 20 wt.-% to 25 wt.-%, in each case relative to the total weight of the potting paste composition.

When the potting paste composition according to the invention contains two or more curing agents, the total content refers to the total amount of all curing agents that are contained in the potting paste composition.

Typically, the curing agents assist the potting paste compositions in curing by crosslinking of the curable polymers such as epoxy resins. It can also be desirable for the curing agents to assist in thermosetting the potting paste composition.

Preferred curing agents are selected from aliphatic or aromatic amines or their respective adducts, amidoamines, polyamides, cycloaliphatic amines, (e.g. anhydrides, polycarboxylic polyesters, isocyanates, phenol-based resins (such as phenol or cresol novolac resins, copolymers such as those of phenol terpene, polyvinyl phenol, or bisphenol-A formaldehyde copolymers, bishydroxyphenyl alkanes or the like), sulfur or mixtures thereof. Particularly preferred curing agents include modified and unmodified polyamines or polyamides such as triethylenetetramine, diethylenetriamine tetraethylenepentamine, cyanoguanidine, dicyandiamides and the like.

Preferably, the curing agent for the curable polymer is selected from the group consisting of polyamines, anhydrides, or combinations thereof. Preferably, however, the potting paste composition according to the invention does not contain harmful curing agents such as 1,2,3,6-tetrahydromethyl-3,6-methanophthalic anhydride.

A particularly preferred curing agent is methyltetrahydrophthalic anhydride which is commercially available as Aradur HY 918 from the Huntsman Corporation, Salt Lake City, Utah.

Any suitable epoxy curing agent may be used. Preferably a heat activated curing agent is used. Suitable epoxy curing agents may include dicyandiamide curing agents; polyamine curing agents, acid anhydride curing agents, guanidine curing agents, mercaptan curing agents and phenol curing agents. Most preferably the epoxy curing agent is a dicyandiamide curing agent.

An accelerator for the curing agents (e.g., a modified or unmodified urea such as methylene diphenyl bis urea, an imidazole or a combination thereof) may also be contained in the potting paste composition. Other example of curing agent accelerators include, without limitation, metal carbamates (e.g., copper dimethyl dithiocarbamate, zinc dibutyl dithiocarbamate, combinations thereof or the like), disulfides (e.g., dibenzothiazole disulfide).

In preferred embodiments, the composition additionally comprises 0.5-10 wt.-% of an epoxy cure accelerator. Any suitable cure accelerator may be used. Suitable cure accelerators may include aromatic substituted ureas; aliphatic and aromatic tertiary amines such as dimethylaminopropylamine; pyridine; boron complexes, including boron complexes with monoethanolamine; and imidazoles such as 2-ethylmethylimidazole. Most preferably a urea cure accelerator is used.

As suggested, faster curing agents and/or accelerators can be particularly desirable for shortening the time between onset of cure and substantially full cure (i.e., at least 90% of possible cure for the particular curable potting paste composition) and curing the potting paste composition while it maintains its self-supporting characteristics. As used herein, onset of cure is used to mean at least 3% but no greater than 10% of substantially full cure. Generally, it is contemplated that experimentation by the skilled artisan can produce desirable cure times using various of the curing agents and/or accelerators discussed above or others. It has been found that for a dicyanamide curing agent or other agents used for cure during activation, other curing agents or accelerators such as a modified polyamine (e.g., cycloaliphatic amine) sold under the tradename ANCAMINE® 2441 or 2442 or 2014 AS; an imidazole (e.g. 2,4-diamino-6[2'-methylimidazoyl-(1)] ethyl-s-triazine isocyanurate adduct which is sold under the tradename CUREZOL® 2MA-OK; an amine adduct sold under the tradename PN-23, an adipic hydrazide sold under the tradename ADH all commercially available from Air Products or an adduct of imidazole and isocyanate sold under the tradename LC-65 and commercially available from A & C Catalyst can produce particularly desirable cure times.

The curable potting paste composition can be formulated to include a curing agent that at least partially cures the curable potting paste composition prior to heat activation of the curable potting paste composition.

The potting paste composition may include exactly two curing agents. The composition may include more than two curing agents.

At least one of the curing agents may be a modified aliphatic amine.

The composition may include an aliphatic amine curing agent and/or a semi-micronized dicyandiamide curing agent. The composition may include a curing agent to lower the cure temperature of the composition. The composition may include a plurality of curing agents so that charring of the composition is substantially prevented.

The one or more curing agents may include a suitable epoxy curing agent. They may include a curing agent accelerator. The one or more curing agents may have one or more amine functionalities. The curing agent may include or consist of a polyamide. The curing agent may include or consist of an aliphatic amine, e.g., it may include or consist of a polyfunctional aliphatic amine. The curing agent may be a cycloaliphatic amine. The curing agent may include one or more imidazole functional groups. The curing agent may have an amine value of about 20 to 100, e.g., about 50 to about 65.

An amount of a curing agent sufficient to cause curing of the potting paste composition to a fully cured state, when the potting paste composition is subjected to a curing condition (e.g., an elevated temperature) over a period not to exceed about 2 hours, while retaining a working life of at least 1 hour, at least 2 hours at least 4 hours or even at least 6 hours at room temperature. By way of illustration, the curing agent may be present in a proportionate amount, by weight, to the total amount of epoxy resin of about 1:1 to about 1:10, e.g. about 1:5.

As used herein, substantially entirely cured refers to a state of curing when, with the passage of time, a material herein exhibits substantially no variation in its mechanical properties. The paste compositions described herein may be cured upon contact with a heat source and may be considered substantially entirety cured when the composition has a Shore D hardness of at least about 20, as measured by EN ISO 868.

Other additives may be included in the composition of the invention, including one or more of a UV stabilizer, an antioxidant, a processing aid, a blowing agent, a plasticizer, a curing accelerator, colorant, impact modifier, a flexibilizer, a thickener, or a reinforcement (e.g. a fibrous reinforcement). The compositions of the teachings may be provided with a release layer, a handling film, or both.

In a preferred embodiment, the potting paste composition includes a first curing agent and, optionally, a first curing agent accelerator, and a second curing agent and, optionally, a second curing agent accelerator, all of which are preferably latent. The first curing agent and/or accelerator are preferably designed to partially cure the potting paste composition during processing (e.g., processing, mixing, shaping or a combination thereof) of the potting paste composition for at least assisting in providing the potting paste composition with the desirable self-supporting properties. The second curing agent and/or accelerator will then preferably be latent such that they cure the potting paste composition upon exposure to elevated temperature (activation to cure temperature).

Generally, it is contemplated that any of the curing agents and/or curing agent accelerators discussed herein or others may be used as the first and second curing agents for the potting paste compositions and the agents or accelerators used will preferably depend upon the desired conditions of partial cure and the desired conditions of activation. However, it has been found that, for the first curing agent, hindered amines such as such as a modified polyamine (e.g. cycloaliphatic amine) sold under the tradename ANCAMINE® 2442, 2337 or 2014 commercially available from Evonik Corporation, are particularly useful. Other desirable first curing agents are those that cure the polymeric potting paste compositions at temperatures of mixing, formation and/or shaping (e.g., extrusion, molding or the like) of the potting paste composition. Thus, curing agents that preferably cure the curable polymer(s) of the potting paste compositions at temperatures of at least about 30° C., but possibly less, more preferably at least about 50° C. and even more preferably at least about 70° C. and/or temperatures not more than about 150° C., more preferably not more than about 120° C. and even more preferably not more than about 100° C.

As one preferred example of this embodiment, the second curing agent and/or accelerator are latent such that one or both of them cure the potting paste composition by reacting with curable polymer at a second activation temperature or temperature range. However, the first curing agent and/or accelerator are also latent, but either or both of them partially cure the potting paste composition by reacting with curable polymer upon exposure to a first activation temperature that is below the second activation temperature.

The first activation temperature and partial cure will preferably be experienced during potting paste composition mixing, shaping or both. For example, the first temperature and partial cure can be experienced in an extruder that is mixing the ingredient of the potting paste composition and extruding the potting paste composition through a die into a particular shape. As another example, the first temperature and partial cure can be experienced in a molding machine (e.g. injection molding, blow molding compression molding) that is shaping and, optionally, mixing the ingredients of the potting paste composition.

The second activation temperature and substantially full cure can then at a temperature be experienced during processing of the article of manufacture to which the curable potting paste composition has been applied.

Partial cure can be accomplished by a variety of techniques. For example, the first curing agent and/or accelerator may be added to the potting paste composition in sub-stoichiometric amounts such that the curable polymer of the potting paste composition provides substantially more reaction sites than are actually reacted by the first curing agent and/or accelerator. Preferred sub-stoichiometric amounts of first curing agent and/or accelerator preferably cause the reaction of no more than about 60%, no more than about 40% or no more than about 30%, about 25% or even about 15% of the available reaction sites provided by the curable polymer of the potting paste composition. Alternatively, partial cure may be effected by providing a first curing agent and/or accelerator that is only reactive for a percentage of the curable polymers contained in the potting paste composition such as when multiple different curable polymers are contained in the potting paste composition and the first curing agent and/or accelerator is only reactive with one or a subset of the curable polymers. In such an embodiment, the first curing agent and/or accelerator is preferably reactive with no more than about 60 wt.-%, no more than about 40 wt.-% or no more than about 30 wt.-%, about 25 wt.-% or even about 15 wt.-% of the total content of all curable polymers that are contained in the potting paste compositions.

The potting paste composition according to the invention is preferably a one component system.

The potting paste composition according to the invention preferably does not contain blowing agents, i.e. is preferably not volume expandable upon activation, e.g. heat activation.

According to the invention, the potting paste composition also comprises a filler (d) selected from the group consisting of polymeric microspheres, hollow glass microspheres, and thixotropic fillers. For the purpose of the specification, non-thixotropic filler includes but is not limited to polymeric microspheres and hollow glass microspheres.

In preferred embodiments of the invention, the potting paste composition comprises a filler, wherein the filler comprises polymeric microspheres and/or hollow glass microspheres and/or a thixotropic filler; preferably polymeric microspheres as well as hollow glass microspheres as well as a thixotropic filler.

The composition may include a filler having a relatively high surface area to weight ratio; that is, taking into account the density of the filler and its particle sizes. Lightweight low density fillers are preferred.

Typical fillers include but are not limited to particulated materials such as powders, beads, microspheres, or the like. Preferably, the filler includes a relatively low-density material that is generally non-reactive with the other components present in the potting paste composition.

The filler (d) may comprise further materials that may be regarded as filler. Suitable fillers may be an organic filler, an inorganic filler, or a combination of both. The filler may be a hollow filler. The filler may include hollow particles which may be hollow glass microspheres. The filler may consist essentially of hollow glass microspheres. The filler may have an elongated geometry. The filler may have a spherical geometry. The filler may be in a particulated form. The filler may be in the form of a rod, a bead, a whisker, a platelet or any combination thereof. The filler may include silicon. The filler may include amorphous silica. The filler may include soda lime borosilicate glass. The filler may include fumed silica. One illustrative filler includes a plurality of glass beads. For example, the glass beads may be hollow glass microspheres. The glass beads may be hollow glass microspheres. An example of a commercially available filler is a glass bubble product offered by Potters Industries under the designation 34P30.

Examples of fillers include silica, diatomaceous earth, glass, clay, talc, pigments, colorants, glass beads or bubbles, glass, carbon ceramic fibers, antioxidants, and the like. Such fillers, particularly clays, can assist the potting paste composition in leveling itself during flow of the potting paste composition. The clays that may be used as fillers may include clays from the kaolinite, illite, chloritem, smecitite or sepiolite groups, which may be calcined. Examples of suitable fillers, without limitation, talc, vermiculite, pyrophyllite, sauconite, saponite, nontronite, montmorillonite or mixtures thereof. The clays may also include minor amounts of other ingredients such as carbonates, feldspars, micas and quartz. The fillers may also include ammonium chlorides such as dimethyl ammonium chloride and dimethyl benzyl ammonium chloride. Titanium dioxide might also be employed.

In one preferred embodiment, one or more mineral or stone type fillers such as calcium carbonate, sodium carbonate or the like may be used as fillers. In another preferred embodiment, silicate minerals such as mica may be used as fillers. It has been found that, in addition to performing the normal functions of a filler, silicate minerals and mica in particular improve the impact resistance of the cured potting paste composition.

In another preferred embodiment, the filler is selected from the group consisting of fused borosilicate glass in a hollow microsphere or bubble form, acrylonitrile copolymer with inert exterior calcium carbonate coating or combinations thereof.

It is contemplated that one of the fillers or other components of the potting paste composition may be thixotropic for assisting in controlling flow of the potting paste composition as well as properties such as tensile, compressive or shear strength. Such thixotropic fillers can additionally provide self-supporting characteristics to the potting paste composition. Examples of thixotropic fillers include, without limitation, silica, calcium carbonate, clays, aramid fiber or pulp or others. One preferred thixotropic filler is synthetic amorphous precipitated silicon dioxide. A particularly preferred thixotropic filler is fumed silica, i.e. synthetic amorphous silicon dioxide produced by flame hydrolysis.

The content of the fillers in the potting paste composition can range from about 10 wt.-% to 90 about wt.-%, relative to the total weight of the potting paste composition. Preferably, the potting paste has a content of the filler within the range of from 0.1 wt.-% to 30.0 wt.-%, more preferably within the range of from 10 wt.-% to 25.0 wt.-%, most preferably within the range of from 15.0 wt.-% to 25.0 wt.-%, in each case relative to the total weight of the potting paste composition.

When the potting paste composition according to the invention contains two or more fillers, the total content refers to the total amount of all fillers that are contained in the potting paste composition.

Preferably, the filler has an overall density in the range of $0.18 \pm 0.16$ g/cm$^3$, more preferably $0.18 \pm 0.12$ g/cm$^3$, still more preferably $0.18 \pm 0.08$ g/cm$^3$. Thus, when the filler comprises more than a single component, the calculated additive densities of the individual components at their respective relative content amounts to an overall density within the above range, not taking into account any packaging phenomena.

Preferably, the filler contained in the potting paste composition has a bulk density in the range of from 0.02 g/cm$^3$ to 0.25 g/cm$^3$. When the potting paste composition according to the invention contains two or more fillers, the bulk density of each filler that contained in the potting paste composition is within the specified range.

In a preferred embodiment, the potting paste composition contains a non-thixotropic filler, e.g. polymeric microspheres and/or hollow glass microspheres. The non-thixotropic filler may be a relatively high volume to weight filler. The filler may have a density (i.e. a true particle density), per ASTM C128 of about 0.01 to about 5 g/cm$^3$, about 0.01 to about 1 g/cm$^3$, or even about 0.02 g/cm$^3$ to 0.30 g/cm$^3$.

In a particular preferred embodiment, the potting paste composition contains a thixotropic filler, preferably fumed silica.

When a thixotropic filler is employed, the thixotropic filler may have a density (i.e. a true particle density), per ASTM C128 of about 0.01 to about 5 g/cm³, about 0.1 to about 4 g/cm³, or even about 1 g/cm³ to 3 g/cm³.

Preferably, the thixotropic filler has a density in the range of from 2.0 to 2.5 g/cm³, more preferably 2.1 to 2.4 g/cm³, still more preferably 2.2 to 2.3 g/cm³.

A particularly preferred thixotropic filler contained in the potting paste according to the invention is hydrophobic fumed silica having a surface which was treated with polydimethylsiloxane (PDMS), e.g. Cab-O-Sil® TS 720 which is obtainable by the Cabot Corporation, Alpharetta, Georgia.

The filler may include hollow glass microspheres. The filler may consist essentially of hollow glass microspheres characterized by a particle size of from about 20 μm to about 70 μm, whereby at least 50% of the particles have a particle size of at least 35 μm.

In a preferred embodiment, the filler comprises or essentially consists of hollow glass microspheres, which have a density of more than 0.20 g/cm³ but not more than 0.70 g/cm³, preferably within the range of 0.22±0.04 g/cm³, for the purpose of the invention also referred to as "high density hollow glass microspheres". Such high density hollow glass microspheres are commercially available, e.g. Sphericel® 34P30. The advantage of high density hollow glass microspheres is that they still reduce the density of the potting paste composition. However, the disadvantage of the low density hollow glass microspheres is that they increase viscosity and also still reduce mechanical strength, e.g. in terms of compressive strength.

The filler may include an acrylonitrile copolymer shell. The filler may reduce the density of the potting paste composition while increasing the volume of the potting paste composition.

In preferred embodiment, the filler comprises or essentially consists of polymeric microspheres, which have a density of not more than 0.10 g/cm³, preferably within the range of 0.05±0.04 g/cm³, for the purpose of the invention also referred to as "very low density polymeric microspheres". Such very low density polymeric microspheres are commercially available, e.g. Dualite® E030. The advantage of very low density polymeric microspheres is that they very strongly reduce the density of the potting paste composition. However, the disadvantage of the very low density polymeric microspheres is that they increase viscosity and also very strongly reduce mechanical strength, e.g. in terms of compressive strength.

Preferably, the weight content of such very low density polymeric microspheres is at most 15 wt.-%, more preferably at most 14 wt.-%, still more preferably at most 13 wt.-%, yet more preferably at most 12 wt.-%, even more preferably at most 11 wt.-%, most preferably at most 10 wt.-% and in particular at most 9.0 wt.-%, in each case relative to the total weight of the potting paste composition.

In a preferred embodiment, the filler comprises or essentially consists of hollow glass microspheres, which have a density of more than 0.10 g/cm³ but not more than 0.30 g/cm³, preferably within the range of 0.25±0.04 g/cm³, for the purpose of the invention also referred to as "low density hollow glass microspheres". Such low density hollow glass are commercially available, e.g. Sphericel® 25P45. The advantage of low density hollow glass microspheres is that they still significantly reduce the density of the potting paste composition. However, the disadvantage of the low density hollow glass microspheres is that they increase viscosity and also still significantly reduce mechanical strength, e.g. in terms of compressive strength.

Preferably, the weight content of such low density hollow glass microspheres is at most 15 wt.-%, more preferably at most 14 wt.-%, still more preferably at most 13 wt.-%, yet more preferably at most 12 wt.-%, even more preferably at most 11 wt.-%, most preferably at most 10 wt.-% and in particular at most 9.0 wt.-%, in each case relative to the total weight of the potting paste composition.

In preferred embodiment of the invention, the filler comprises
- (A) polymeric microspheres having a density in the range of 0.030±0.020 g/cm³, preferably 0.030±0.015 g/cm³, more preferably 0.030±0.010 g/cm³, still more preferably 0.030±0.005 g/cm³; wherein the content of the polymeric microspheres is preferably in the range of 0.90±0.80 wt.-%, preferably 0.90±0.60 wt.-%, more preferably 0.90±0.40 wt.-%, in each case relative to the total weight of the composition; and/or
- (B) hollow glass microspheres having a density in the range of 0.18±0.15 g/cm³, preferably g/cm³, more preferably 0.18±0.10 g/cm³, still more preferably 0.18±0.05 g/cm³; wherein the content of the hollow glass microspheres is preferably in the range of 19±15 wt.-%, preferably 19±10 wt.-%, more preferably 19±5 wt.-%, in each case relative to the total weight of the composition; and/or
- (C) a thixotropic filler having a density in the range of 2.25±0.40 g/cm³, preferably 2.25±0.30 more preferably 2.25±0.20 g/cm³, still more preferably 2.25±0.10 g/cm³; wherein the content of the thixotropic filler is preferably in the range of 0.10±0.09 wt.-%, preferably 0.10±0.07 wt.-%, more preferably 0.10±0.05 wt.-%, in each case relative to the total weight of the composition.

It has been surprisingly found that a good compromise between weight reduction on the one hand and mechanical strength on the other hand can be achieved by combining microspheres having different properties with one another.

In a preferred embodiment, the filler comprises a combination of microspheres having different properties, especially different density. Preferably, the filler comprises at least two different microspheres selected from very low density polymeric microspheres, low density hollow glass microspheres, and high density hollow glass microspheres as defined above.

In a preferred embodiment, the filler comprises very low density polymeric microspheres and high density hollow glass microspheres, preferably at a relative weight ratio within the range of from about 3:1 to about 1:3, or from about 2:1 to about 1:2, or from about 1.5:1 to about 1:1.5, or from about 3:1 to about 1.1:1, or from about 2:1 to about 1.1:1, or from about 1.5:1 to about 1.1:1, or from about 1:1.1 to about 1:3, or from about 1:1.1 to about 1:2, or from about 1.1:1 to about 1:1.5.

In another preferred embodiment, the filler comprises very low density polymeric microspheres and low density hollow glass microspheres, preferably at a relative weight ratio within the range of from about 3:1 to about 1:3, or from about 2:1 to about 1:2, or from about 1.5:1 to about 1:1.5, or from about 3:1 to about 1.1:1, or from about 2:1 to about 1.1:1, or from about 1.5:1 to about 1.1:1, or from about 1:1.1 to about 1:3, or from about 1:1.1 to about 1:2, or from about 1.1:1 to about 1:1.5.

In still another preferred embodiment, the filler comprises low density hollow glass microspheres and high density hollow glass microspheres, preferably at a relative weight ratio within the range of from about 3:1 to about 1:3, or from about 2:1 to about 1:2, or from about 1.5:1 to about 1:1.5, or from about 3:1 to about 1.1:1, or from about 2:1 to about 1.1:1, or from about 1.5:1 to about 1.1:1, or from about 1:1.1 to about 1:3, or from about 1:1.1 to about 1:2, or from about 1.1:1 to about 1:1.5.

In a particularly preferred embodiment, the filler comprises (i) very low density polymeric microspheres, wherein preferably the weight content of the very low density polymeric microspheres, relative to the total weight of the filler, is within the range of about 33±32 wt.-%, more preferably about 33±24 wt.-%, still more preferably about 33±16 wt.-%, most preferably about 33±8 wt.-%;

(ii) low density hollow glass microspheres, wherein preferably the weight content of the low density hollow glass microspheres, relative to the total weight of the filler, is within the range of about 33±32 wt.-%, more preferably about 33±24 wt.-%, still more preferably about 33±16 wt.-%, most preferably about 33±8 wt.-%; and (iii) high density hollow glass microspheres, wherein preferably the weight content of the high density polymer glass, relative to the total weight of the filler, is within the range of about 40±30 wt.-%, more preferably about 36±30 wt.-%, still more preferably about 35±28 wt.-%, most preferably about 33±25 wt.-%.

The filler may include or may consist essentially of hollow glass microspheres characterized by a particle size of from about 20 μm to about 70 μm, whereby preferably at least 50% of the particles have a particle size of at least 35 μm.

The filler may be present, by weight, in a proportion of filler relative to the total curable polymer, e.g. epoxy resin, of about 1:5 to about 2:1, e.g., about 1:3 to about 1:1, or even about 1:2.5. The proportion of the weight of the curable polymer, e.g. epoxy resin, relative to the filler is preferably about 5:1 to about 1:2.

The potting paste composition according to the invention comprises as component (c) a fire retardant comprising
an ammonium polyphosphate in combination with
an ingredient selected from the group consisting of metal hydroxides, expandable graphites, liquid phosphate esters, phosphorous organic compounds or salts thereof, and zeolites.

Preferably, the potting paste composition according to the invention comprises as component (c) a fire retardant comprising
an ammonium polyphosphate and a metal hydroxide;
optionally in combination with an ingredient selected from the group consisting of, expandable graphites, liquid phosphate esters, phosphorous organic compounds or salts thereof, and zeolites.

Fire retardants are known to the person skilled in the art and are typically substances that are used to slow or stop the spread of fire or reduce its intensity. At this point, reference is made to the following books as examples: A. R. Horrocks, D. Price, *Fire retardant Materials*, Woodhead Publishing, 2001. or A. R. Horrocks, D. Price, *Advances in Fire retardant Materials*, Woodhead Publishing, 2008.

For the purpose of the specification, a fire retardant may have the effect of retarding flame formation (flame retardant), suppress smoke formation (smoke suppressor), provide synergism to flame retardancy (flame retardant synergist), swelling upon heat exposure (intumescent) and any combination thereof.

According to a particularly preferred embodiment, the fire retardant and the potting paste composition, respectively, comprises three components, i.e. a combination of an ammonium polyphosphate and an expandable graphite and a zeolite.

According to another particularly preferred embodiment, the fire retardant and the potting paste composition, respectively, comprises three components, i.e. a combination of an ammonium polyphosphate and an expandable graphite and a zeolite, wherein the weight ratio of zeolite:expandable graphite is within the range of from 1:10 to 10:1, more preferably within the range of from 1:5 to 5:1, still more preferably within the range of from 1:2 to 2:1 and most preferably about 1:1.

According to still another particularly preferred embodiment, the fire retardant and the potting paste composition, respectively, comprises three components, i.e. a combination of an ammonium polyphosphate and an expandable graphite and a zeolite, wherein the weight ratio of zeolite:expandable graphite is within the range of from 1:10 to 10:1, more preferably within the range of from 1:5 to 5:1, still more preferably within the range of from 1:2 to 2:1 and most preferably about 1:1 and wherein the potting paste composition comprises neither metal hydroxide nor liquid phosphate ester nor phosphorous organic compound or salt thereof.

According to another preferred embodiment, the fire retardant and the potting paste composition, respectively, comprises four components, i.e. a combination of an ammonium polyphosphate, a metal hydroxide, a liquid phosphate ester and a salt of a phosphorus organic compound.

According to still another preferred embodiment, the fire retardant and the potting paste composition, respectively, comprises five components, i.e. a combination of an ammonium polyphosphate, a metal hydroxide, an expandable graphite, a liquid phosphate ester, and a salt of a phosphorus organic compound.

In preferred embodiments, (a) means an ammonium polyphosphate, (b) means a metal hydroxide, (c) means an expandable graphites, (d) means a liquid phosphate ester, (e) means a phosphorous organic compound or salt thereof, and (0 means a zeolite, and the fire retardant comprises
the following binary combinations:
(a)+(b); (a)+(c); (a)+(d); (a)+(e); (a)+(f); (b)+(c); (b)+(d); (b)+(e); (b)+(f); (c)+(d); (c)+(e); (c)+(f); (d)+(e); (d)+(f); (e)+(f); or
the binary combination (a)+(b), wherein the potting paste composition neither comprises (c) nor (d) nor (e);
the binary combination (a)+(c), wherein the potting paste composition neither comprises (b) nor (d) nor (e);
the following ternary combinations:

(a) + (b) + (c); (a) + (b) + (d); (a) + (b) + (e); (a) + (b) + (f); (a) + (c) + (d); (a) + (c) + (e); (a) + (c) + (f); (a) + (d) + (e); (a) + (d) + (f); (a) + (e) + (f); (b) + (c) + (d); (b) + (c) + (e); (b) + (c) + (f); (b) + (d) + (e); (b) + (d) + (f); (b) + (e) + (f); (c) + (d) + (e); (c) + (d) + (f); (c) + (e) + (f); (d) + (e) + (f); preferably (a) + (c) + (f);

or
the ternary combination (a)+(c)+(f), wherein the potting paste composition neither comprises (b) nor (d) nor (e);
or the following quaternary combinations:

(a) + (b) + (c) + (d); (a) + (b) + (c) + (e); (a) + (b) + (c) + (f); (a) + (b) + (d) + (e); (a) + (b) + (d) + (f);
(a) + (b) + (e) + (f); (a) + (c) + (d) + (e); (a) + (c) + (d) + (f); (a) + (c) + (e) + (f); (a) + (d) + (e) + (f);
(b) + (c) + (d) + (e); (b) + (c) + (d) + (f); (b) + (c) + (e) + (f); (b) + (d) + (e) + (f); (c) + (d) + (e) + (f); preferably
(a) + (b) + (d) + (e);

or
the quaternary combination (a)+(b)+(d)+(e), wherein the potting paste composition comprises no (c); or
the following quaternary combinations: (a)+(b)+(c)+(d) or (a)+(b)+(c)+(e) or (a)+(c)+(d)+(e), wherein the potting paste composition comprises no (f); or
the quaternary combination (a)+(b)+(d)+(e), wherein the potting paste composition comprises no (c) and no (f); or
the following pentanary combinations:

(a) + (b) + (c) + (d) + (e); (a) + (b) + (c) + (d) + (f); (a) + (b) + (c) + (e) + (f); (a) + (b) + (d) + (e) + (f);
(a) + (c) + (d) + (e) + (f); (b) + (c) + (d) + (e) + (f); preferably (a) + (b) + (c) + (d) + (e);

or
the pentanary combination (a)+(b)+(c)+(d)+(e), wherein the potting paste composition comprises no (f); or
the following combination of all (a)+(b)+(c)+(d)+(e)+(f).

It has been surprisingly found that the inventive combination provides improved fire retardancy and improved smoke properties, especially in terms of smoke density and smoke toxicity.

Further, it has been surprisingly found that the preferred
  ternary combinations of an ammonium polyphosphate and an expandable graphite and a zeolite; and
  pentanary combinations of an ammonium polyphosphate, a metal hydroxide, an expandable graphite, a liquid phosphate ester, and a salt of a phosphorus organic compound
provide improved flammability characteristics with regard to the burn length and after flame time and reduced smoke density.

Still further, it has been surprisingly found that the preferred quaternary composition of an ammonium polyphosphate, a metal hydroxide, a liquid phosphate ester and a salt of a phosphorus organic compound provides improved flammability characteristics with regard to the burn length and reduced smoke density.

The ammonium polyphosphate, which preferably acts as a flame retardant, is preferably employed and commercially available in form of a powder.

Preferably, the ammonium polyphosphate is selected from the group consisting of crystal phase I ammonium polyphosphates (APP, phase I), crystal phase II ammonium polyphosphates (APP, phase II) or combinations thereof.

Preferably, the ammonium polyphosphate contained in the potting paste composition essentially consists of crystal phase II ammonium polyphosphate (APP, phase II).

A preferred crystal phase II ammonium polyphosphate (APP, phase II) is commercially available as Aflammit® PCI 202 from Thor.

Preferably, the potting paste composition has a content of the ammonium polyphosphate within the range of from 5.0 wt.-% to 15.0 wt.-%, preferably within the range of from 8.5 wt.-% to 12.5 wt.-%, in each case relative to the total weight of the potting paste composition.

When the potting paste composition according to the invention contains two or more ammonium polyphosphates, the total content refers to the total amount of all ammonium polyphosphates that are contained in the potting paste composition.

In preferred embodiments, the potting paste according to the invention contains a metal hydroxide.

The metal hydroxide, which preferably acts as a flame retardant as well as a smoke suppressor, is preferably also employed and commercially available in form of a powder.

Preferably, the metal hydroxide is selected from the group consisting of aluminum trihydroxide (ATH), magnesium dihydroxide (MDH), and mixtures thereof.

In a preferred embodiment, the metal hydroxide contained in the potting paste composition essentially consists of aluminum trihydroxide (ATH).

In another preferred embodiment, the metal hydroxide contained in the potting paste composition essentially consists of aluminum trihydroxide and minor amounts of silicon dioxide ($SiO_2$), iron oxide ($Fe_2O_3$) and disodium oxide ($Na_2O$), e.g. MoldX® A 400 which is obtainable by J. M. Huber Corporation, Edison, New Jersey.

Preferably, the content of the metal hydroxide is within the range of from 0.1 wt.-% to 30 wt.-%, more preferably within the range of from 5 wt.-% to 20 wt.-%, most preferably within the range of from 10 wt.-% to 15 wt.-%, in each case relative to the total weight of the potting paste composition.

When the potting paste composition according to the invention contains two or more metal hydroxides, the total content refers to the total amount of all metal hydroxides that are contained in the potting paste composition.

In preferred embodiments, the potting paste composition according to the invention contains an expandable graphite.

The expandable graphite, which preferably acts as a flame retardant as well as a smoke suppressor and as intumescent, is preferably also employed and commercially available in form of a powder.

Expandable graphite is commercially available, e.g. as Aflammit PCI 599 obtainable from Thor.

Preferably, the content of the expandable graphite is at most 10 wt.-%, more preferably at most 9.0 wt.-%, still more preferably at most 8.0 wt.-%, yet more preferably at most 7.0 wt.-%, even more preferably at most 6.0 wt.-%, most preferably at most 5.5 wt.-%, and in particular at most 5.0 wt.-%, in each case relative to the total weight of the potting paste composition. Preferably, the content of the expandable graphite is within the range of from 0.1 wt.-% to 10 wt.-%, more preferably within the range of from 1 wt.-% to 8 wt.-%, most preferably within the range of from 3 wt.-% to 5 wt.-%, in each case relative to the total weight of the potting paste composition.

When the potting paste composition according to the invention contains two or more expandable graphites, the total content refers to the total amount of all expandable graphites that are contained in the potting paste composition.

In preferred embodiments, the potting paste composition according to the invention contains a liquid phosphate ester.

The phosphate ester, which preferably acts as a flame retardant, is preferably employed and commercially available in form of a liquid. Furthermore, it has been surprisingly found that it may act as a diluent for the potting paste composition such that the content of other liquid constituents, such as epoxy resin diluents and/or liquid epoxy resins, can be significantly reduced or even be completely omitted, while still imparting a pasty consistency.

Preferably, the liquid phosphate ester is a liquid aromatic phosphate ester, preferably having a phosphorous content of at least about 4 wt.-%, more preferably of at least about 6 wt.-%, still more preferably of at least about 8 wt.-% and particularly preferred of at least about 10 wt.-%.

A particular preferred liquid phosphate ester is tetraphenyl-m-phenylene bis(phosphat), e.g. Aflammit® PFL 280 obtainable from Thor.

Preferably, the content of the liquid phosphate ester, preferably a liquid aromatic phosphate ester, is within the range of from 0.1 wt.-% to 5 wt.-%, more preferably within the range of from 1.0 wt.-% to 3.0 wt.-%, most preferably within the range of from 1.5 wt.-% to 2.0 wt.-%, in each case relative to the total weight of the potting paste composition.

When the potting paste composition according to the invention contains two or more liquid phosphate esters, the total content refers to the total amount of all liquid phosphate esters that are contained in the potting paste composition.

In preferred embodiments, the potting paste composition according to the invention contains a phosphorous organic compound or salt thereof.

Preferably, the phosphorous organic compound or salt thereof does not include phosphate esters.

The phosphorous organic compound or salt thereof, which preferably acts as a flame retardant, is preferably employed and commercially available in form of a powder.

Preferably, the content of the phosphorous organic compound or salt thereof is within the range of from 0.1 wt.-% to 3.0 wt.-%, more preferably within the range of from 0.5 wt.-% to 2.6 wt.-%, most preferably within the range of from 0.9 wt.-% to 1.5 wt.-%, in each case relative to the total weight of the potting paste composition.

When the potting paste composition according to the invention contains two or more phosphorous organic compounds or salts thereof, the total content refers to the total amount of all phosphorous organic compounds or salts thereof that are contained in the potting paste composition.

In preferred embodiments, the potting paste composition according to the invention contains a zeolite.

The zeolite, which preferably acts as a flame retardant synergist, is preferably employed and commercially available in form of a powder.

In a particular preferred embodiment of the potting paste composition according to the invention, the fire retardant comprises a sodium form of a synthetic type A zeolite having a pore opening size within the range of from 2.0 to 6.0 Å, preferably 3.0 to 5.0 Å, more preferably 3.5 to 4.5 Å, still more preferably 3.8 to 4.2 Å.

Preferably, the fire retardant comprises a zeolite wherein the content of the zeolite is within the range of from 0.1 wt.-% to 10.0 wt.-%, more preferably within the range of from 1.0 wt.-% to 8.0 wt.-%, most preferably within the range of from 3.0 wt.-% to 5.0 wt.-%, in each case relative to the total weight of the potting paste composition.

In a preferred embodiment of the potting paste composition, the weight ratio of zeolite:expandable graphite is within the range of from 1:10 to 10:1, more preferably within the range of from 1:5 to 5:1, still more preferably within the range of from 1:2 to 2:1 and most preferably equal to about 1.

In a preferred embodiment, the potting paste composition according to the invention does not contain heat expandable graphite. In preferred embodiments, the potting paste composition comprises neither an intumescent graphite nor a red phosphorus nor zinc borate.

In a particularly preferred embodiment, component (c) of the potting paste composition according to the invention comprises or essentially consists of a combination of an ammonium polyphosphate (e.g. Aflammit® PCI 202), an expandable graphite (e.g. Aflammit® PCI 599) and synthetic zeolite (e.g. Siliporite® NK10AP).

The ammonium polyphosphate provides particularly good flame resistance, has a good influence on smoke density (smoke opacity), and has a good influence on smoke toxicity at an advantageous weight content within the potting paste composition. The ammonium polyphosphate has the disadvantage of a comparatively high price.

The metal hydroxide provides excellent flame resistance, has a very good influence on smoke density (smoke opacity), and has an excellent influence on smoke toxicity at a comparatively high weight content within the potting paste composition. The metal hydroxide has the disadvantage of a comparatively high density.

The expandable graphite provides particularly good flame resistance and has a very good influence on smoke density (smoke opacity) and acts as intumescent.

The liquid phosphate ester provides particularly good flame resistance and has a good influence on smoke toxicity at an advantageous weight content within the potting paste composition. One of its major advantages is that it reduces the viscosity of the potting paste composition without deteriorating its flame retardance. The liquid phosphate ester has the disadvantage of a comparatively high price.

The phosphorus organic compound or salt thereof provides particularly good flame resistance.

The zeolite provides particularly good flame resistance and has a very good influence on smoke density (smoke opacity).

It has been surprisingly found that the above advantages and disadvantages can be well balanced thereby providing potting paste compositions providing excellent performance at reasonable weight and costs.

Preferably, the ammonium polyphosphate
- has an average molecular weight within the range of from abbot 500 g/mol to about 5000 g/mol, or about 1000 g/mol to about 3500 g/mol, or about 1500 g/mol to about 3000 g/mol; and/or
- has a phosphorous content of at least about 15%, or at least about 20%, or at least about 25%, or at least about 30%; and/or
- has a nitrogen content of at least about 4%, or at least about 7%, or at least about 10%, or at least about 13%.

The ammonium polyphosphate may or may not be encapsulated.

Suitable non encapsulated ammonium polyphosphates can be readily available commercially, under the tradename Exolit® AP-422 from Clariant, FR Cros® 484 from Budenheim, Antiblaze® LR3 from Albemarle, APP1001 from Dgtech International and Aflammit® PCI-202 from Thor.

In a preferred embodiment, the ammonium polyphosphate is encapsulated. Suitable encapsulated ammonium polyphosphates are described in U.S. Pat. Nos. 4,347,334, 4,467,056, 4,514,328, and 4,639,331 hereby incorporated by reference. Such encapsulated ammonium polyphosphates contain a hardened, water insoluble resin enveloping the individual ammonium polyphosphate particles. The resin may be a phenol-formaldehyde resin, an epoxy resin, a surface reacted silane, a surface reacted melamine or a melamine-formaldehyde resin. As an example for use is the encapsulated ammonium polyphosphate available under the trademark FR CROS® C 60, FR CROS® C30, FR CROS® C70 from Chemische Fabrik Budenheim, Budenheim am Rhein, Germany, EXOLIT® 462 from Hoechst Celanese Corporation, Somerville, N.J. For example, the encapsulated ammonium polyphosphate can be a melamine-formaldehyde encapsulated ammonium polyphosphate additive.

Preferably, the liquid phosphate ester is a liquid aromatic phosphate ester. Suitable liquid phosphate esters are commercially available (e.g. Aflammit® PLF 280 from Thor). Preferably, the liquid phosphate ester has a phosphorous content of at least about 4%, or at least about 6%, or at least about 8%, or at least about 10%.

Preferred metal hydroxides include aluminum trihydroxide, magnesium hydroxide, and mixtures thereof.

In a preferred embodiment, the relative weight ratio of the liquid phosphate ester (or when there is more than one liquid phosphate ester, of the total weight of all liquid phosphate esters) to the metal hydroxide (or when there is more than one metal hydroxide, of the total weight of all metal hydroxides) is within the range of from about 5:1 to about 1:5, or about 4:1 to about 1:4, or about 3:1 to about 1:3, or about 2:1 to about 1:2, or about 1.5:1 to about 1:1.5.

In another preferred embodiment, the relative weight ratio of the liquid phosphate ester (or when there is more than one liquid phosphate ester, of the total weight of all liquid phosphate esters) to the metal hydroxide (or when there is more than one metal hydroxide, of the total weight of all metal hydroxides) is within the range of from about 5:1 to about 1.1:1, or about 4:1 to about 1.1:1, or about 3:1 to about 1.1:1, or about 2:1 to about 1.1:1, or about 1.5:1 to about 1.1:1.

In still another preferred embodiment, the relative weight ratio of the metal hydroxide (or when there is more than one metal hydroxide, of the total weight of all metal hydroxides) to the liquid phosphate ester (or when there is more than one liquid phosphate ester, of the total weight of all liquid phosphate esters) is within the range of from about 5:1 to about 1.1:1, or about 4:1 to about 1.1:1, or about 3:1 to about 1.1:1, or about 2:1 to about 1.1:1, or about 1.5:1 to about 1.1:1.

In a preferred embodiment, the relative weight ratio of the ammonium polyphosphate (or when there is more than one ammonium polyphosphate, of the total weight of all ammonium polyphosphates) to the metal hydroxide (or when there is more than one metal hydroxide, of the total weight of all metal hydroxides) is within the range of from about 5:1 to about 1:5, or about 4:1 to about 1:4, or about 3:1 to about 1:3, or about 2:1 to about 1:2, or about 1.5:1 to about 1:1.5.

In another preferred embodiment, the relative weight ratio of the ammonium polyphosphate (or when there is more than one ammonium polyphosphate, of the total weight of all ammonium polyphosphates) to the metal hydroxide (or when there is more than one metal hydroxide, of the total weight of all metal hydroxides) is within the range of from about 5:1 to about 1.1:1, or about 4:1 to about 1.1:1, or about 3:1 to about 1.1:1, or about 2:1 to about 1.1:1, or about 1.5:1 to about 1.1:1.

In still another preferred embodiment, the relative weight ratio of the metal hydroxide (or when there is more than one metal hydroxide, of the total weight of all metal hydroxides) to the ammonium polyphosphate (or when there is more than one ammonium polyphosphate, of the total weight of all ammonium polyphosphates) is within the range of from about 5:1 to about 1.1:1, or about 4:1 to about 1.1:1, or about 3:1 to about 1.1:1, or about 2:1 to about 1.1:1, or about 1.5:1 to about 1.1:1.

In a preferred embodiment, the relative weight ratio of the ammonium polyphosphate (or when there is more than one ammonium polyphosphate, of the total weight of all ammonium polyphosphates) to the liquid phosphate ester (or when there is more than one liquid phosphate ester, of the total weight of all liquid phosphate esters) is within the range of from about 5:1 to about 1:5, or about 4:1 to about 1:4, or about 3:1 to about 1:3, or about 2:1 to about 1:2, or about 1.5:1 to about 1:1.5.

In another preferred embodiment, the relative weight ratio of the ammonium polyphosphate (or when there is more than one ammonium polyphosphate, of the total weight of all ammonium polyphosphates) to the liquid phosphate ester (or when there is more than one liquid phosphate ester, of the total weight of all liquid phosphate esters) is within the range of from about 5:1 to about 1.1:1, or about 4:1 to about 1.1:1, or about 3:1 to about 1.1:1, or about 2:1 to about 1.1:1, or about 1.5:1 to about 1.1:1.

In still another preferred embodiment, the relative weight ratio of the liquid phosphate ester (or when there is more than one liquid phosphate ester, of the total weight of all liquid phosphate esters) to the ammonium polyphosphate (or when there is more than one ammonium polyphosphate, of the total weight of all ammonium polyphosphates) is within the range of from about 5:1 to about 1.1:1, or about 4:1 to about 1.1:1, or about 3:1 to about 1.1:1, or about 2:1 to about 1.1:1, or about 1.5:1 to about 1.1:1.

In a particularly preferred embodiment, the fire retardant (component (c)) comprises
  (i) an ammonium polyphosphate, wherein preferably the weight content of the ammonium polyphosphate, relative to the total weight of the fire retardant, is within the range of about 33±32 wt.-%, more preferably about 33±24 wt.-%, still more preferably about 33±16 wt.-%, most preferably about 33±8 wt.-%; and
  (ii) expandable graphite, wherein preferably the weight content of the expandable graphite, relative to the total weight of the fire retardant, is within the range of about 33±32 wt.-%, more preferably about 33±24 wt.-%, still more preferably about 33±16 wt.-%, most preferably about 33±8 wt.-%; and
  (iii) a zeolite, preferably the sodium form of a synthetic type A zeolite having a pore opening size of approximately 4 Å, wherein preferably the weight content of the zeolite, relative to the total weight of the fire retardant, is within the range of about 33±32 wt.-%, more preferably about 33±24 wt.-%, still more preferably about 33±16 wt.-%, most preferably about 33±8 wt.-%.

The fire retardant (component (c)) can be a fairly substantial weight percentage of the potting paste composition. Preferably, the total weight content of the fire retardant (weight content of ammonium polyphosphate (i) plus weight content at least one or more ingredients selected from the group consisting of (ii) metal hydroxides, (iii) expandable graphites, (iv) liquid phosphate esters, (v) phosphorous organic compounds or salts thereof, and (vi) zeolites and any combination thereof) is at least about 2 wt.-%, more preferably at least about 12 wt.-%, even more preferably at least about 20 wt.-%, still more preferably at least about 25 wt.-%, yet more preferably at least about 30 wt.-% and even possibly at least about 35 wt.-%, in each case relative to the total weight of the potting paste composition. In a preferred embodiment, the total weight content of the fire retardant (weight content of ammonium polyphosphate (i) plus weight content at least one or more ingredients selected from the group consisting of (ii) metal hydroxides, (iii) expandable graphites, (iv) liquid phosphate esters, (v) phosphorous organic compounds or salts thereof, and (vi) zeolites and any combination thereof) is within the range of from about 25 wt.-% to about 40 wt.-%, more preferably from about 25 wt.-% to about 35 wt.-%, in each case relative to the total weight of the potting paste composition.

In preferred embodiments, the potting paste composition comprises at least about 5 wt.-% fire retardant, in some embodiments at least about 10 wt.-% fire retardant, and in some embodiments at least about 15 wt.-% fire retardant, in each case relative to the total weight of the potting paste composition. In preferred embodiments, the potting paste composition comprises not more than 21 wt.-% fire retardant, relative to the total weight of the potting paste composition.

It is preferred that component (c), i.e. the fire retardant, be halogen free.

The composition may additionally include further fire retardants (e.g., a halogen-free flame retardants, such as a phosphorus containing flame retardants).

The fire retardant (component (c)) is sufficient so that when the potting paste composition is cured it will meet the requirements for flame retardancy as set forth in 14 C.F.R. § 25.853 (the United States Code of Federal Regulations for aerospace compartment interiors, including but not limited to 14 C.F.R. § 25.853(a), and the referenced Appendix F and procedures referenced therein (e.g., 60 second vertical burn test per 14 C.F.R. § 25.853 App. F Part 1(a)(1)(i), smoke density test per 14 C.F.R. § 25.853 App. F Part V) or the smoke toxicity test per AITM 3.0005 (as required by Airbus), all of which are incorporated by reference for all purposes).

The proportionate amount, by weight, of the fire retardant relative to the curable polymer, e.g. epoxy resin, may be about 2:1 to about 1:3, e.g., about 1:2.

Upon achieving a degree of cure of at least about 75%, a resulting cured potting paste composition exhibits sufficient flame retardancy to meet the requirements of one or more of FAR 25.853.

The potting paste composition according to the invention may optionally also comprise as component (e) a thermoplastic resin.

Any suitable thermoplastic resin may be used in the potting paste composition according to the invention. Preferably, the thermoplastic resin has a Vicat softening point of between 60° C. and 150° C., as measured by EN ISO 306 method A50. In preferred embodiments, the thermoplastic resin has a softening point of not more than 150° C., in some embodiments not more than 135° C., in some embodiments not more than 120° C., in some embodiments not more than 105° C., and in some embodiments not more than 95° C. In preferred embodiments, the thermoplastic resin has a softening point of at least about 60° C., in some embodiments at least about 70° C., and in some embodiments at least about 80° C. Preferably, the thermoplastic resin is a polymer comprising phenylene oxide (—Ph—O—) units in its polymer backbone. In preferred embodiments, the thermoplastic resin is a phenoxy resin. In preferred embodiments, the thermoplastic resin is a copolymer of bisphenol a and epichlorohydrin. In preferred embodiments the thermoplastic resin is a polyethersulfone.

In preferred embodiments, the potting paste composition comprises at least about 10 wt.-% thermoplastic resin, in some embodiments at least about 16 wt.-% thermoplastic resin, and in some embodiments at least about 18 wt.-% thermoplastic resin, in each case relative to the total weight of the potting paste composition. In preferred embodiments, the potting paste composition comprises not more than 35 wt.-% thermoplastic resin, in some embodiments not more than 30 wt.-% thermoplastic resin, and in some embodiments not more than 25 wt.-% thermoplastic resin, in each case relative to the total weight of the potting paste composition.

Other additives, agents or performance modifiers may also be included in the potting paste composition according to the invention as desired, including but not limited to UV resistant agents, impact modifiers, heat stabilizers, UV photoinitiators, colorants, processing aids, lubricants, and reinforcements (e.g., chopped or continuous glass, ceramic, aramid, or carbon fiber or the like).

In preferred embodiments, the potting paste composition additionally comprises one or more pigments.

In preferred embodiments, the potting paste composition additionally comprises one or more toughening agents.

In preferred embodiments, the potting paste composition additionally comprises one or more rheology modifiers.

In preferred embodiments, the potting paste composition additionally comprises one or more mineral particles. In preferred embodiments, the mineral particles are alumina. In preferred embodiments, the mineral particles are silica, e.g. fumed silica. In preferred embodiments, the mineral particles are calcite. Preferably, the content of mineral particles is at most 10 wt.-%, more preferably at most 9.0 wt.-%, still more preferably at most 8.0 wt.-%, yet more preferably at most 7.0 wt.-%, even more preferably at most 6.0 wt.-%, most preferably at most 5.0 wt.-%, and in particular at most 4.0 wt.-%, in each case relative to the total weight of the potting paste composition.

In preferred embodiments, the potting paste composition additionally comprises one or more hollow glass microspheres. In preferred embodiments, the hollow glass microspheres are glass. In preferred embodiments, the hollow glass microspheres are polymeric.

In preferred embodiments, the composition additionally comprises one or more fibers.

Another aspect of the invention relates to the use of the potting paste composition according to the invention as described above for reinforcing a sandwich structure, preferably a honeycomb structure; more preferably as core or edge filling of a sandwich structure, preferably of a honeycomb structure; preferably as an insert or edge filling of honeycomb structures, i.e. on interior honeycomb sandwich structures as edge close-out, corner reinforcement, local reinforcement for mechanical fixation, complex gap or mismatch area filling, and the like. It is particularly useful to reinforce honeycomb structures, especially at locations for mechanical fixation where it is intended to drill holes or make mechanical attachments to other parts e.g. by means of screws and the like.

The invention further provides for a method of reinforcing a sandwich structure, preferably a honeycomb structure, the method comprising the steps of:

a) providing a potting paste composition according to the invention;
b) providing a honeycomb panel having a plurality of openings;
c) pumping or troweling the potting paste composition into one or more of the plurality of openings;
d) optionally, compressing the potting paste composition within the one or more openings that receives the paste; and
e) curing the potting paste composition.

The potting paste composition according to the invention is pumped or troweled into one or more of the plurality of openings of the honeycomb panel thereby providing reinforcement to the sandwich structure, e.g. honeycomb panel. The potting paste composition according to the invention is preferably neither provided in form of a coating or film, nor is it used to for preparing a coating or film, i.e. a thin layer of material, to a given surface.

Preferably, the curing includes exposing the potting paste composition to an elevated temperature of at least about 110° C.

Preferably, the curing is essentially completed within not more than 2 hours, preferably not more than 1 hour, more preferably not more than 40 minutes.

The mass of potting paste may be in pumpable form. The composition may be applied within the interstices of a honeycomb form (e.g., a non-metallic honeycomb form, such as a core of a sandwich laminate). The composition may be applied along one or more side edges of a panel structure, which may be a honeycomb form. The compositions may be maintained in a refrigerated (e.g., frozen) condition until the time of their intended use. For example, the teachings herein envision maintaining the compositions herein at a temperature of less than about 10° C., 5° C., 0° C., –10° C., or even –20° C. At the time of the intended use, the teachings envision allowing the compositions herein to be exposed to an activation condition (e.g., heat, moisture, radiation, or otherwise). For example, the teachings may employ a step of allowing the compositions to warm to a predetermined temperature (e.g., about 23° C. or higher) for a sufficient amount of time so that substantially homogeneous curing of the composition occurs substantially throughout the composition.

The teachings herein find application in the transportation industry (e.g., for use in automotive vehicles, aircraft, railcars, or otherwise, such as in panel structures), in the construction industry (e.g., as wall panels), or elsewhere. Articles made using the compositions of the teachings herein are also envisioned within the scope of the teachings. Examples of such articles include, without limitation, potted structures, panels with an edge close-out, locally reinforced structures (such as a locally reinforced panel), a core-spliced body (e.g., a spliced honeycomb structural panel). The articles may be panels (e.g., ceiling and/or side walls), partitions, cargo and/or baggage compartments, or the like. Any of the foregoing may include a honeycomb structure that defines a plurality of voids into which the composition of the present teaching is inserted.

It is contemplated that the honeycomb panel structure may be derived from a variety of articles. Exemplary articles include household or industrial appliance (e.g., dishwashers, washing machines, dryers or the like), furniture, storage containers or the like. In a preferred embodiment, the honeycomb panel structure is employed in a transportation vehicle (e.g., an automotive vehicle, a boat, an airplane or the like). When used for a transportation vehicle, the panel structure has been found to be particularly useful panel structure of an aerospace vehicle (e.g., an airplane). As such, the panel structure of the present invention is primarily discussed in relation to an airplane, however, the invention should not be so limited unless otherwise stated.

The facing sheet of the honeycomb panel structure may be formed of a variety of materials. Exemplary materials include metals, polymeric materials (e.g., plastics, elastomers, thermoplastics, thermosets, combinations thereof or the like). The materials of the honeycomb panels may also be reinforced with minerals, fibrous materials (e.g., glass, carbon or nylon fibers), combinations thereof or the like. In a preferred embodiment, one facing sheet is formed of fiberglass/plastic composite and another is formed of a metal or metal alloy.

In another aspect, the present invention provides a cured composition obtained by curing the potting paste composition as described above.

Another aspect of the invention relates to a honeycomb structure comprising the potting paste composition according to the invention as described, either prior to activation, or in its activated and cured state.

The potting paste composition according to the invention may be made by any suitable method. Preferably, liquid ingredients are mixed first together, then fillers are added one by one and mixed.

Mixing is performed under conditions that impart relatively low shear forces to the admixed ingredients, to thereby help to avoid heat generation that would induce premature curing. It is possible that a planetary mixer may be employed for any of the mixing steps. Mixing proceeds until all ingredients appear to be substantially homogeneously mixed. Mixing may proceed in a plurality of relatively brief intervals (e.g., about 5 to about 30 seconds, such as about 10 to about 15 seconds), or at some other interval sufficient to help avoid heating.

Particularly preferred embodiments of the invention are summarized as clauses 1 to 52 hereinafter: 1: A potting paste composition comprising (a) a curable polymer; (b) a curing agent for the curable polymer; (c) a fire retardant comprising—an ammonium polyphosphate in combination with—an ingredient selected from the group consisting of metal hydroxides, expandable graphites, liquid phosphate esters, phosphorous organic compounds or salts thereof, and zeolites; preferably an ammonium polyphosphate and a metal hydroxide, optionally in combination with an ingredient selected from the group consisting of expandable graphites, liquid phosphate esters, phosphorous organic compounds or salts thereof, and zeolites; and (d) a filler selected from the group consisting of polymeric microspheres, hollow glass microspheres, and thixotropic fillers; preferably wherein the potting paste has an uncured density determined by the method according to EN ISO 1183 of not more than 0.7100 g/cm$^3$; and wherein the total content of the fire retardant is at least 5.0 wt.-%, relative to the total weight of the potting paste composition. 2: The potting paste composition according to clause 1, wherein the ammonium polyphosphate is selected from the group consisting of crystal phase I ammonium polyphosphates, crystal phase II ammonium polyphosphates, and combinations thereof 3: The potting paste composition according to clause 1 or 2, wherein the ammonium polyphosphate essentially consists of crystal phase II ammonium polyphosphate. 4: The potting paste composition according to any of clauses 1 to 3, wherein the content of the ammonium polyphosphate is within the range of from 5.0 wt.-% to 15.0 wt.-%, preferably within the range of from 8.5 wt.-% to 12.5 wt.-%, in each case relative to the total weight of the potting paste composition. 5: The potting paste composition according to any of the preceding clauses, wherein the fire retardant comprises a metal hydroxide selected from the group consisting of aluminum trihydroxide, magnesium dihydroxide, and mixtures thereof 6: The potting paste composition according to any of the preceding clauses, wherein the fire retardant comprises a metal hydroxide and wherein the content of the metal hydroxide is within the range of from 0.1 wt.-% to 30 wt.-%, more preferably from 5 wt.-% to 20 wt.-%, most preferably from 10 wt.-% to 15 wt.-%, in each case relative to the total weight of the potting paste composition. 7: The potting paste composition according to any of the preceding clauses, wherein the fire retardant comprises an expandable graphite and wherein the content of the expandable graphite is within the range of from 0.1 wt.-% to 10 wt.-%, more preferably within the range of from 1 wt.-% to 8 wt.-%, most preferably within the range of from 3 wt.-% to 5 wt.-%, in each case relative to the total weight of the potting paste composition. 8: The potting paste composition according to any of the preceding clauses, wherein the fire retardant comprises a liquid aromatic phosphate ester, preferably having a phosphorous content of at least 4 wt.-%, more preferably of at least 6 wt.-%, still more preferably of at least 8 wt.-% and particularly preferred of at least 10 wt.-%. 9: The potting paste composition according to clause 8, wherein the liquid phosphate ester is tetraphenyl-m-phenylene bis(phosphate). 10: The potting paste composition according to any of the preceding clauses, wherein the fire retardant comprises a liquid phosphate ester and wherein the content of the liquid phosphate ester is within the range of from 0.1 wt.-% to 5 wt.-%, more preferably within the range of from 1.0 wt.-% to 3.0 wt.-%, most preferably within the range of from 1.5 wt.-% to 2.0 wt.-%, in each case relative to the total weight of the potting paste composition. 11: The potting paste composition according to any of the preceding clauses, wherein the fire retardant comprises a phosphorous organic compound or salt thereof 12: The potting paste composition according to any of the preceding clauses, wherein the fire retardant comprises a phosphorous organic compound or salt thereof and wherein the content of the phosphorous organic compound or salt thereof is within the range of from 0.1 wt.-% to 3.0 wt.-%, more preferably within the range of from 0.5 wt.-% to 2.6 wt.-%, most preferably within the range of from 0.9 wt.-% to 1.5 wt.-%, in each case relative to the total weight of the potting paste composition. 13: The potting paste composition according to any of the preceding clauses, wherein the fire retardant comprises a sodium form of a synthetic type A zeolite having a pore opening size within the range of from 2.0 to 6.0 Å, preferably 3.0 to 5.0 Å, more preferably 3.5 to 4.5 Å, still more preferably 3.8 to 4.2 Å. 14: The potting paste composition according to any of the preceding clauses, wherein the fire retardant comprises a zeolite and wherein the content of the zeolite is within the range of from 0.1 wt.-% to 10.0 wt.-%, more preferably within the range of from 1.0 wt.-% to 8.0 wt.-%, most preferably within the range of from 3.0 wt.-% to 5.0 wt.-%, in each case relative to the total weight of the potting paste composition. 15: The potting paste composition according to any of the preceding clauses, wherein the fire retardant comprises an ammonium polyphosphate in combination with a metal hydroxide and liquid phosphate ester. 16: The potting paste composition according to any of the preceding clauses, wherein the fire retardant comprises an ammonium polyphosphate in combination with a metal hydroxide and a phosphorous organic compound or salt thereof 17: The potting paste composition according to any of the preceding clauses, wherein the fire retardant comprises an ammonium polyphosphate in combination with a liquid phosphate ester and a phosphorous organic compound or salt thereof 18: The potting paste composition according to any of the preceding clauses, wherein the fire retardant comprises an ammonium polyphosphate in combination with a metal hydroxide and a liquid phosphate ester and a phosphorous organic compound or salt thereof 19: The potting paste composition according to any of clauses 15 to 18, wherein the fire retardant additionally comprises an expandable graphite. 20: The potting paste composition according to clause 18, wherein the potting paste composition comprises no expandable graphite. 21: The potting paste composition according to clause 19 or 20, wherein the potting paste composition comprises no zeolite. 22: The potting paste composition according to any of clauses 1 to 14, wherein the fire retardant comprises an ammonium polyphosphate in combination with an expandable graphite. 23: The potting paste composition according to clause 22, wherein the fire retardant additionally comprises a zeolite. 24: The potting paste composition according to clause 23, wherein the weight ratio of zeolite:expandable graphite is within the range of from 1:10 to 10:1, more preferably within the range of from 1:5 to 5:1, still more preferably within the range of from 1:2 to 2:1 and most preferably about 1:1. 25: The potting paste composition according to any of clauses 22 to 24, wherein the potting paste composition comprises neither metal hydroxide nor liquid phosphate ester nor phosphorous organic compound or salt thereof 26: The potting paste composition according to any of the preceding clauses, which comprises (i) neither an intumescent graphite, nor a red phosphorus, nor zinc borate, nor diantimony trioxide; and/or (ii) neither an aldehyde, nor a brominated epoxy resin, nor sulfuric acid; and/or (iii) neither nickel, nor 2,2'-iminodi(ethylamine), nor 4,4'-isopropylidenediphenol. 27: The potting paste composition according to any of the preceding clauses, wherein the filler is selected from the group consisting of fused borosilicate glass in a hollow microsphere or bubble form, acrylonitrile copolymer with inert exterior calcium carbonate coating, or combinations thereof 28: The potting paste composition according to any of the preceding clauses, wherein the filler has a bulk density within the range of from 0.02 g/cm$^3$ to 0.25 g/cm$^3$. 29: The potting paste composition according to any of the preceding clauses, wherein the content of the filler is within the range of from 0.1 wt.-% to 30.0 wt.-%, more preferably within the range of from 10 wt.-% to 25.0 wt.-%, most preferably within the range of from 15.0 wt.-% to 25.0 wt.-%, in each case relative to the total weight of the potting paste composition. 30: The potting paste composition according to any of the preceding clauses, wherein the filler is a thixotropic filler comprising fumed silica having a density in the range of from 2.1 to 2.4 g/cm$^3$. 31: The potting paste composition according to clause 30, wherein the surface of the fumed silica was treated with polydimethylsiloxane. 32: The potting paste composition according to any of the preceding clauses, wherein the curable polymer is an epoxy resin. 33: The potting paste composition according to any of the preceding clauses, wherein the curable polymer is a liquid epoxy resin. 34: The potting paste composition according to any of the preceding clauses, wherein the curable polymer is selected from the group consisting of bisphenol-F based liquid epoxy resins, epoxy phenol novolac resins having a viscosity at room temperature in the range of from 1100 and 1700 mPa·s, and combinations thereof 35: The potting paste composition according to any of the preceding clauses, wherein the content of the curable polymer is within the range of from 20 wt.-% to 50 wt.-%, preferably within the range of from 25 wt.-% to 45 wt.-%, most preferably within the range of from 30 wt.-% to 40 wt.-%, in each case relative to the total weight of the potting paste composition. 36: The potting paste composition according to any of the preceding clauses, wherein the curing agent for the curable polymer is selected from polyamines and anhydrides, or combinations thereof 37: The potting paste composition according to clause 36, wherein the curing agent is methyltetrahydrophthalic anhydride. 38: The potting paste composition according to any of the preceding clauses, wherein the content of the curing agent is within the range of from 10 wt.-% to 35 wt.-%, preferably within the range of from 15 wt.-% to 30 wt.-%, most preferably within the range of from 20 wt.-% to 25 wt.-%, in each case relative to the total weight of the potting paste composition. 39: The potting paste composition according to any of the preceding clauses, which provides a smoke toxicity that passes the test according to AITM 3.0005. 40: The potting paste composition according to any of the preceding clauses, which exhibits a vertical burn length determined on a sample of 3 mm thickness in a vertical burn test FAR 25 Appendix F Part 1 (a)(1)(i)/AITM 2.0002 A of below 152 mm, preferably not more than 150 mm, more preferably not more than 140 mm, even more preferably not more than 130 mm, yet more preferably not more than 100 mm, most preferably not more than 80 mm and in particular not more than 60 mm. 41: The potting paste composition according to any of the preceding clauses, which exhibits an after flame time determined on a sample of 3 mm thickness in a vertical burn test FAR 25 Appendix F Part 1 (a)(1)(i)/AITM 2.0002 A of below 6 seconds, preferably not more than 5 seconds, more preferably not more than 4 seconds, still more preferably not more than 2 seconds, and most preferably about 0 seconds. 42: The potting paste composition according to any of the preceding clauses, which exhibits an optical smoke density DS determined on a sample of 3 mm thickness FAR 25 Appendix F Part 1 (a)(1)(i)/AITM 2.0002 A of below 200, more preferably not more than 180, even more preferably not more than 160, still more preferably not more than 140 and most preferably not more than 120. 43: The potting paste composition according to any of the preceding clauses, which is pumpable. 44: The potting paste composition according to any of the preceding clauses, which has an uncured density of at most 0.680 g/cm$^3$, more preferably of at most 0.673 g/cm$^3$, still more preferably of at most 0.660 g/cm$^3$, even more preferably of at most 0.658 g/cm$^3$, yet more preferably of at most 0.653 g/cm$^3$ and in particular of at most 0.620 g/cm$^3$. 45: The potting paste composition according to any of the preceding clauses, which has a compressive strength at room temperature determined according to ASTM D695 of at least 30 MPa, preferably of at least 32 MPa, more preferably of at least 35 MPa. 46: The potting paste composition according to any of the preceding clauses, which has a compressive modulus at room temperature determined according to ASTM D695 of at least 1100 MPa, preferably of at least 1200 MPa, more preferably of at least 1400 MPa, still more preferably of at least 1700 MPa, most preferably of at least 1800 MPa. 47: The potting paste composition according to any of the preceding clauses, which is provided in form of a one-component system. 48: The potting paste composition according to any of the preceding clauses, wherein the curable polymer reacts with the curing agent for the curable polymer at an activation temperature above room temperature. 49: Use of a potting paste composition according to any of the preceding clauses for reinforcing a sandwich structure, preferably a honeycomb structure; more preferably as core or edge filling of a sandwich structure, preferably of a honeycomb structure. 50: A method of reinforcing a sandwich structure, preferably a honeycomb structure, the method comprising the steps of: a) providing a potting paste composition according to any of clauses 1 to 48; b) providing a honeycomb panel having a plurality of openings; c) pumping or troweling the potting paste composition into one or more of the plurality of openings; d) optionally, compressing the potting paste composition within the one or more openings that receives the paste; and e) curing the potting paste composition. 51: The method according to clause 50, wherein the curing includes exposing the potting paste composition to an elevated temperature of at least 110° C. 52: The method according to clause 50 or 51, wherein the curing is essentially completed within not more than 2 hours, preferably not more than 1 hour, more preferably not more than 40 minutes.

Objects and advantages of this disclosure are further illustrated by the following examples, but the particular materials and amounts thereof recited in these examples, as well as other conditions and details, should not be construed to unduly limit this disclosure.

The compositions of the exemplified potting paste compositions are compiled in the following Tables 1 to 4. Unless otherwise stated, the numerical values of the ingredients are given in wt.-%

The compositions were subjected to the 60 second Vertical Burn test per 14 C.F.R. § 25.853 App. F Part 1(a)(1)(i) and the Smoke Density test per 14 C.F.R. § 25.853 App. F Part V, or Smoke Toxicity test per AITM 3.0005.

TABLE 1

Examples 1 to 3

| | | | Example | | |
|---|---|---|---|---|---|
| | Ingredients | | 1 | 2 | 3 |
| REACTIVE EPOXY | | Bisphenol-F based liquid epoxy resin | 22.05 | 23.36 | 23.12 |
| | | Low-viscosity epoxy phenol novolac resin | 12.00 | 14.91 | 14.76 |
| CURING AGENT | | Modified polyamine | 4.78 | 4.75 | 4.71 |
| | | Methyltetrahydrophthalic anhydride | 17.00 | 19.73 | 19.53 |
| FIRE RETARDANT | FR | Ammonium polyphosphate | 12.07 | 12.00 | 11.87 |
| | | Salt of phosphorous organic compound | — | — | — |
| | | Tetraphenyl resorcinol bis(diphenylphosphate) | — | — | — |
| | FRS | Sodium form of synthetic zeolite type A (4 Å) | 4.00 | 3.98 | 3.94 |
| | FR/SS/INT | Expandable graphite | 4.00 | 3.98 | 3.94 |
| | FR + SS | Aluminum trihydroxide | — | — | — |
| | | Optimized aluminum trihydroxide, 99.6% Al(OH)$_3$ | — | — | — |
| FILLER | | Acrylonitrile copolymer with exterior CaCO$_3$ coating, ρ = 0.03 g/cm$^3$ | 1.00 | 0.80 | 1.08 |

TABLE 1-continued

Examples 1 to 3

| | Ingredients | Example 1 | Example 2 | Example 3 |
|---|---|---|---|---|
| | Fused borosilicate glass in a hollow microsphere, $\rho = 0.22$ g/cm$^3$ | 15.00 | 11.41 | 11.30 |
| | Fused borosilicate glass in a hollow microsphere, $\rho = 0.14$ g/cm$^3$ | 8.00 | 4.98 | 5.67 |
| THIXOTROPIC FILLER | Fumed silica, surface modified with polydimethylsiloxane (PDMS) | 0.10 | 0.10 | 0.10 |
| TOTAL SUM [wt.-%]: | | 100.00 | 100.00 | 100.00 |
| Uncured density [g/cm$^3$] | | 0.6728 | 0.6580 | 0.6132 |
| Density of sample [g/cm$^3$] | | 0.6889 | 0.6466 | 0.6423 |
| Flammability | Burn length [mm] | 80 | 97 | 60 |
| | After flame time [s] | 0 | 0 | 0 |
| Smoke density (Sample of 3 mm thickness) [<200] | | — | — | 119/101 |
| Smoke toxicity (Sample of 3 mm thickness) | | — | — | Pass |
| Compressive strength at RT [MPa] | | 35.7 ± 1.9 | 35.7 ± 1.2 | 30.3 ± 1.2 |
| Compressive modulus at RT [MPa] | | 1490 ± 97 | 1258 ± 35 | 1191 ± 32 |
| Compression sample density [g/cm$^3$] | | 0.6444 | 0.6513 | 0.6122 |

FR = Flame retardant,
SS = Smoke suppressor,
FRS = Flame retardant synergist,
INT = Intumescent

TABLE 2

Examples 4 to 6

| | | Ingredients | Example 4 | Example 5 | Example 6 |
|---|---|---|---|---|---|
| REACTIVE EPOXY | | Bisphenol-F based liquid epoxy resin | 22.97 | 21.45 | 20.03 |
| | | Low-viscosity epoxy phenol novolac resin | 12.73 | 12.73 | 12.75 |
| CURING AGENT | | Modified polyamine | 4.78 | 4.78 | 4.79 |
| | | Methyltetrahydrophthalic anhydride | 16.27 | 16.27 | 16.29 |
| FIRE RETARDANT | FR | Ammonium polyphosphate | 11.48 | 11.48 | 11.50 |
| | | Salt of phosphorous organic compound | 1.44 | 1.44 | 1.44 |
| | | Tetraphenylresorcinol bis(diphenylphosphate) | 1.91 | 1.91 | 1.91 |
| | FRS | Sodium form of synthetic zeolite type A (4 Å) | — | — | — |
| | FR/SS/INT | Expandable graphite | — | — | — |
| | FR + SS | Aluminum trihydroxide | 11.48 | 13.00 | 14.47 |
| | | Optimized aluminum trihydroxide, 99.6% Al(OH)$_3$ | — | — | — |
| FILLER | | Acrylonitrile copolymer with exterior CaCO$_3$ coating, $\rho = 0.03$ g/cm$^3$ | 1.15 | 1.15 | 1.00 |
| | | Fused borosilicate glass in a hollow microsphere, $\rho = 0.22$ g/cm$^3$ | 11.48 | 11.48 | 11.50 |
| | | Fused borosilicate glass in a hollow microsphere, $\rho = 0.14$ g/cm$^3$ | 4.21 | 4.21 | 4.22 |
| THIXOTROPIC FILLER | | Fumed silica, surface modified with polydimethylsiloxane (PDMS) | 0.10 | 0.10 | 0.10 |
| TOTAL SUM [wt.-%]: | | | 100.00 | 100.00 | 100.00 |
| Uncured density [g/cm$^3$] | | | 0.6533 | 0.6600 | 0.6800 |
| Density of sample [g/cm$^3$] | | | 0.5974 | 0.6157 | 0.6825 |
| Flammability | | Burn length [mm] | 148 | 138 | 134 |
| | | After flame time [s] | 2 | 0 | 4 |
| Smoke density (Sample of 3 mm thickness) [<200] | | | 154.3 ± 7.0 | 141.0 ± 10.4 | 144.0 ± 9 |
| Smoke toxicity (Sample of 3 mm thickness) | | | Pass | Pass | Pass |
| Compressive strength at RT [MPa] | | | 32.2 ± 0.85 | 36.8 ± 1.7 | 39.1 ± 0.8 |
| Compressive modulus at RT [MPa] | | | 1704 ± 65 | 1640 ± 25 | 1747 ± 111 |
| Compression sample density [g/cm$^3$] | | | 0.6502 | 0.6640 | 0.6870 |

FR = Flame retardant,
SS = Smoke suppressor,
FRS = Flame retardant synergist,
INT = Intumescent

TABLE 3

Examples 7 to 9

|  |  | Example 7 | Example 8 | Example 9 |
|---|---|---|---|---|
| REACTIVE EPOXY | Bisphenol-F based liquid epoxy resin | 19.05 | 19.05 | 20.07 |
|  | Low-viscosity epoxy phenol novolac resin | 12.12 | 16.11 | 13.35 |
| CURING AGENT | Modified polyamine | 4.55 | 3.60 | 3.51 |
|  | Methyltetrahydrophthalic anhydride | 15.50 | 17.88 | 18.57 |
| FIRE RETARDANT — FR | Ammonium polyphosphate | 11.50 | 8.84 | 13.55 |
|  | Salt of phosphorous organic compound | 0.95 | 2.50 | 2.51 |
|  | Tetraphenyl resorcinol bis(diphenylphosphate) | 1.82 | 2.63 | — |
| FRS | Sodium form of synthetic zeolite type A (4 Å) | — | — | — |
| FR/SS/INT | Expandable graphite | 4.76 | — | — |
| FR + SS | Aluminum trihydroxide | — | 9.07 | 13.35 |
|  | Optimized aluminum trihydroxide, 99.6% Al(OH)$_3$ | 13.76 | — | — |
| FILLER | Acrylonitrile copolymer with exterior CaCO$_3$ coating, $\rho$ = 0.03 g/cm$^3$ | 0.95 | 0.79 | 0.63 |
|  | Fused borosilicate glass in a hollow microsphere, $\rho$ = 0.22 g/cm$^3$ | 10.93 | 14.27 | 10.04 |
|  | Fused borosilicate glass in a hollow microsphere, $\rho$ = 0.14 g/cm$^3$ | 4.01 | 5.26 | 4.42 |
| THIXOTROPIC FILLER | Fumed silica, surface modified with polydimethylsiloxane (PDMS) | 0.10 | — | — |
| TOTAL SUM [wt.-%]: |  | 100.00 | 100.00 | 100.00 |
| Uncured density [g/cm$^3$] |  | 0.7040 | 0.6400 | 0.6800 |
| Density of sample [g/cm$^3$] |  | 0.6804 | 0.6474 | 0.6834 |
| Flammability | Burn length [mm] | 48 | 152 | 120 |
|  | After flame time [s] | 0 | 15 | 1 |
| Smoke density (Sample of 3 mm thickness) [<200] |  | 119/101/112 | — | 211 |
| Smoke toxicity (Sample of 3 mm thickness) |  | Pass | — | N/A |
| Compressive strength at RT [MPa] |  | 30.7 ± 0.96 | 34.6 ± 0.69 | 38.1 ± 1.1 |
| Compressive modulus at RT [MPa] |  | 1777 ± 49 | 1849 ± 97 | 1630 ± 90 |
| Compression sample density [g/cm$^3$] |  | 0.6953 | 0.6234 | 0.6901 |

FR = Flame retardant,
SS = Smoke suppressor,
FRS = Flame retardant synergist,
INT = Intumescent

TABLE 4

Example 10

|  | Ingredients | Example 10 |
|---|---|---|
| REACTIVE EPOXY | Bisphenol-F based liquid epoxy resin | 20.26 |
|  | Low-viscosity epoxy phenol novolac resin | — |
| CURING AGENT | Modified polyamine | 1.38 |
|  | Methyltetrahydrophthalic anhydride | 23.94 |
| FIRE RETARDANT — FR | Ammonium polyphosphate | 19.80 |
|  | Salt of phosphorous organic compound | — |
|  | Tetraphenylresorcinol bis(diphenylphosphate) | — |
|  | Melamine | 19.80 |
| FRS | Sodium form of synthetic zeolite type A (4 Å) | — |
| FR/SS/INT | Expandable graphite | — |
| FR + SS | Aluminum trihydroxide | — |
|  | Optimized aluminum trihydroxide, 99.6% Al(OH)$_3$ | — |
| FILLER | Acrylonitrile copolymer with exterior CaCO$_3$ coating, $\rho$ = 0.03 g/cm$^3$ | 2.39 |
|  | Fused borosilicate glass in a hollow microsphere, $\rho$ = 0.22 g/cm$^3$ | 11.05 |
|  | Fused borosilicate glass in a hollow microsphere, $\rho$ = 0.14 g/cm$^3$ | — |
| THIXOTROPIC FILLER | Fumed silica, surface modified with polydimethylsiloxane (PDMS) | 0.46 |
| TOTAL SUM [wt.-%]: |  | 100.00 |
| Uncured density [g/cm$^3$] |  | 0.69 |
| Density of sample [g/cm$^3$] |  | 0.73 |
| Flammability | Burn length [mm] | 30 |
|  | After flame time [s] | 4 |
| Smoke density (Sample of 3 mm thickness) [<200] |  | 500 |
| Smoke toxicity (Sample of 3 mm thickness) |  | Pass |
| Compressive strength at RT [MPa] |  | 35 |
| Compressive modulus at RT [MPa] |  | 1290 |
| Compression sample density [g/cm$^3$] |  | 0.73 |

All ingredients were mixed and heated to a temperature of maximum 40° C.

The smoke toxicity of the inventive potting paste and the comparative potting paste composition were determined (curing cycle 3°/min+55 min @140° C./Sample thickness 3 mm/Standard AITM 3.0005) and the measured values are compiled in the following table:

| Gas | inventive | comparative |
|---|---|---|
| HF | 0 ppm | 100 ppm |
| HCl | 0 ppm | 150 ppm |
| NOx | <70 ppm | 100 ppm |
| $SO_2$ | <10 ppm | 100 ppm |
| HCN | <30 ppm | 150 ppm |

The results of the measurements of smoke density are shown in FIG. 1 (FIG. 1, with aluminum trihydroxide, Example 6; FIG. 2, without aluminum trihydroxide, Example 10).

As demonstrated by the above experimental data, the potting paste composition according to the invention has excellent mechanical properties and improved flame retardance, especially in terms of smoke density and smoke toxicity.

The invention claimed is:

1. A potting paste composition comprising:
    (a) a curable polymer;
    (b) a curing agent for the curable polymer;
    (c) a fire retardant comprising an ammonium polyphosphate, a zeolite, and a metal hydroxide; and
    (d) a filler selected from the group consisting of polymeric microspheres, hollow glass microspheres, and thixotropic fillers;
        wherein the total content of the fire retardant is at least 5.0 wt.-%, relative to the total weight of the potting paste composition.

2. The potting paste composition according to claim 1, wherein the potting paste composition has an uncured density determined by the method according to EN ISO 1183 of not more than 0.7100 g/cm³.

3. The potting paste composition according to claim 1, wherein the ammonium polyphosphate is selected from the group consisting of crystal phase I ammonium polyphosphates, crystal phase II ammonium polyphosphates, and combinations thereof.

4. The potting paste composition according to claim 1, wherein the metal hydroxide is selected from the group consisting of aluminum trihydroxide, magnesium dihydroxide, and mixtures thereof.

5. The potting paste composition according to claim 1, wherein the fire retardant additionally comprises an ingredient selected from the group consisting of expandable graphites, liquid phosphate esters, phosphorous organic compounds or salts thereof, and zeolites.

6. The potting paste composition according to claim 1, wherein the fire retardant additionally comprises an expandable graphite.

7. The potting paste composition according to claim 1, wherein the potting paste composition comprises no expandable graphite.

8. The potting paste composition according to claim 1, wherein the fire retardant additionally comprises a liquid phosphate ester.

9. The potting paste composition according to claim 8, wherein the liquid phosphate ester is tetraphenyl-m-phenylene bis(phosphate).

10. The potting paste composition according to claim 1, wherein the potting paste composition comprises no liquid phosphate ester.

11. The potting paste composition according to claim 8, wherein the fire retardant additionally comprises a phosphorous organic compound or salt thereof.

12. The potting paste composition according to claim 1, wherein the potting paste composition comprises no phosphorous organic compound or salt thereof.

13. The potting paste composition according to claim 1, wherein the zeolite is a sodium form of a synthetic type A zeolite having a pore opening size within the range of from 2.0 to 6.0 A.

14. The potting paste composition according to claim 1, wherein the fire retardant comprises the ammonium polyphosphate in combination with the metal hydroxide and a liquid phosphate ester and a phosphorous organic compound or salt thereof.

15. The potting paste composition according to claim 3, which comprises (i) neither an intumescent graphite, nor a red phosphorus, nor zinc borate, nor diantimony trioxide; and/or (ii) neither an aldehyde, nor a brominated epoxy resin, nor sulfuric acid; and/or (iii) neither nickel, nor 2,2'-iminodi(ethylamine), nor 4,4'-isopropylidenediphenol.

16. The potting paste composition according to claim 1, wherein the filler is a thixotropic filler comprising fumed silica having a density in the range of from 2.1 to 2.4 g/cm³.

17. The potting paste composition according to claim 1, wherein the curable polymer is a liquid epoxy resin.

18. The potting paste composition according to claim 1, wherein the curing agent for the curable polymer is methyltetrahydrophthalic anhydride.

19. The potting paste composition according to claim 13, wherein the pore opening size is within the range of from 3.0 to 5.0 A.

20. The potting paste composition according to claim 13, wherein the pore opening size is within the range of from 3.5 to 4.5 A.

* * * * *